US008786803B2

(12) United States Patent
Kim et al.

(10) Patent No.: US 8,786,803 B2
(45) Date of Patent: Jul. 22, 2014

(54) BACKLIGHT ASSEMBLY AND DISPLAY APPARATUS HAVING THE SAME

(75) Inventors: Hyoung-Joo Kim, Anyang-si (KR); Heugon Kim, Yongin-si (KR); Sung-Kyu Shim, Seoul (KR); JinHee Park, Cheonan-si (KR); JooYoung Kim, Cheonan-si (KR); Jae-Hyun Kim, Asan-si (KR); So-Yeon Lee, Hwaseong-si (KR); Gicherl Kim, Asan-si (KR); Seokhyun Nam, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 444 days.

(21) Appl. No.: 13/038,932

(22) Filed: Mar. 2, 2011

(65) Prior Publication Data

US 2011/0279753 A1 Nov. 17, 2011

(30) Foreign Application Priority Data

May 13, 2010 (KR) .................. 10-2010-0045084
Sep. 28, 2010 (KR) .................. 10-2010-0093871

(51) Int. Cl.
*G02F 1/1335* (2006.01)
(52) U.S. Cl.
USPC .............................................. 349/65; 349/58
(58) Field of Classification Search
None
See application file for complete search history.

(56) References Cited

U.S. PATENT DOCUMENTS

| 7,614,777 | B2 * | 11/2009 | Koganezawa et al. | 362/620 |
|---|---|---|---|---|
| 7,777,834 | B2 * | 8/2010 | Uehara et al. | 349/68 |
| 8,007,158 | B2 * | 8/2011 | Woo et al. | 362/612 |
| 2005/0002175 | A1 * | 1/2005 | Matsui et al. | 362/31 |
| 2007/0058108 | A1 * | 3/2007 | Uehara et al. | 349/86 |
| 2007/0217219 | A1 * | 9/2007 | Makuta et al. | 362/606 |
| 2007/0236957 | A1 * | 10/2007 | Koganezawa et al. | 362/561 |
| 2008/0316767 | A1 * | 12/2008 | Woo et al. | 362/612 |
| 2009/0290093 | A1 * | 11/2009 | Shimura et al. | 349/62 |
| 2010/0290246 | A1 * | 11/2010 | Kim et al. | 362/602 |
| 2011/0199558 | A1 * | 8/2011 | Hamada | 349/62 |
| 2013/0141395 | A1 * | 6/2013 | Holmgren et al. | 345/175 |
| 2013/0155723 | A1 * | 6/2013 | Coleman | 362/621 |

* cited by examiner

*Primary Examiner* — Kaveh Kianni
(74) *Attorney, Agent, or Firm* — F. Chau & Associates, LLC

(57) ABSTRACT

A display apparatus includes a light guide plate, a light source unit, a display panel, a receiving container, and a driving part. The light guide plate includes at least one chamfered corner and a light incident surface defined by the chamfered corner. The light source unit generates the light and is positioned adjacent to the light incident surface. The display panel receives the light to display an image and the receiving container includes a bottom and sidewalls extended from the bottom to receive the light guide plate and the light source unit. The driving part is electrically connected to the display panel to apply a driving signal to the display panel and is electrically connected to the light source unit to apply a power source voltage to the light source unit.

24 Claims, 26 Drawing Sheets

BACKLIGHT ASSEMBLY AND DISPLAY APPARATUS HAVING THE SAME

CROSS-REFERENCE TO RELATED APPLICATION

This application claims priority to Korean Patent Applications No. 10-2010-0093871 filed on Sep. 28, 2010 and 10-2010-0045084 filed May 13, 2010, the contents of which are herein incorporated by reference in their entireties.

BACKGROUND

1. Technical Field

The present invention relates to a backlight assembly and a display apparatus having the same. More particularly, the present invention relates to a backlight assembly capable of reducing manufacturing costs and a size of the backlight assembly and a display apparatus having the backlight assembly.

2. Discussion of the Related Art

A backlight assembly that employs light emitting diodes as its light source and a display apparatus that has the backlight assembly have been developed. The backlight assembly employing the light emitting diodes has properties, such as low power consumption, small size, high brightness, etc., compared to a backlight assembly employing a cold cathode fluorescent lamp as its light source. However, in the case that the light emitting diodes are applied to the display apparatus as the light source instead of the cold cathode fluorescent lamp, a manufacturing cost of the backlight assembly may increase.

SUMMARY

Exemplary embodiments of the present invention provide a backlight assembly capable of reducing manufacturing costs and a size of the backlight assembly.

Exemplary embodiments of the present invention also provide a display apparatus having the backlight assembly.

According to the exemplary embodiments, a backlight assembly includes a light guide plate and a light source unit.

The light guide plate includes at least one chamfered corner and a light incident surface defined by the chamfered corner, and the light source unit generates light and is positioned adjacent to the light incident surface.

The light guide plate includes a first side surface connected to the light incident surface, and a portion of the first side surface, which may have a width equal to a thickness of the light guide plate, is removed by a depth to form a coupling recess.

According to the exemplary embodiments, the display apparatus includes a light guide plate, a light source unit, a display panel, a receiving container, and a driving part.

The light guide plate includes at least one chamfered corner and a light incident surface defined by the chamfered corner. The light source unit generates light and is positioned adjacent to the light incident surface.

The display panel receives the light to display an image, and the receiving container includes a bottom and sidewalls extended from the bottom to receive the light guide plate and the light source unit. The driving part is electrically connected to the display panel to apply a driving signal to the display panel and is electrically connected to the light source unit to apply a power source voltage to the light source unit.

The light guide plate includes a first side surface connected to the light incident surface, and a portion of the first side surface, which may have a width equal to a thickness of the light guide plate, is removed by a depth to form a coupling recess.

According to the above, the light guide plate includes the light incident surface defined by the chamfered corner and the light source unit provides the light to the light incident surface. Thus, the number of the light sources may be reduced, the size of the backlight assembly may be reduced, and the wiring structure may be simplified, thereby reducing the manufacturing costs of the backlight assembly.

In addition, when the receiving container is coupled to the cover member by using a coupling device, such as a screw and a user hole is formed in the receiving container, the user hole, which corresponds to the coupling recess, provides a space into which the screw can be inserted, to thereby prevent the light guide plate from being damaged by the screw.

BRIEF DESCRIPTION OF THE DRAWINGS

The exemplary embodiments of the present invention will become readily apparent by reference to the following detailed description when considered in conjunction with the accompanying drawings wherein.

DETAILED DESCRIPTION

It will be understood that when an element or layer is referred to as being "on", "connected to" or "coupled to" another element or layer, it can be directly on, connected or coupled to the other element or layer or intervening elements or layers may be present. Like numbers may refer to like elements throughout. As used herein, the term "and/or" includes any and all combinations of one or more of the associated listed items.

Hereinafter, the exemplary embodiments of the present invention will be explained in further detail with reference to the accompanying drawings.

Figure 1A:
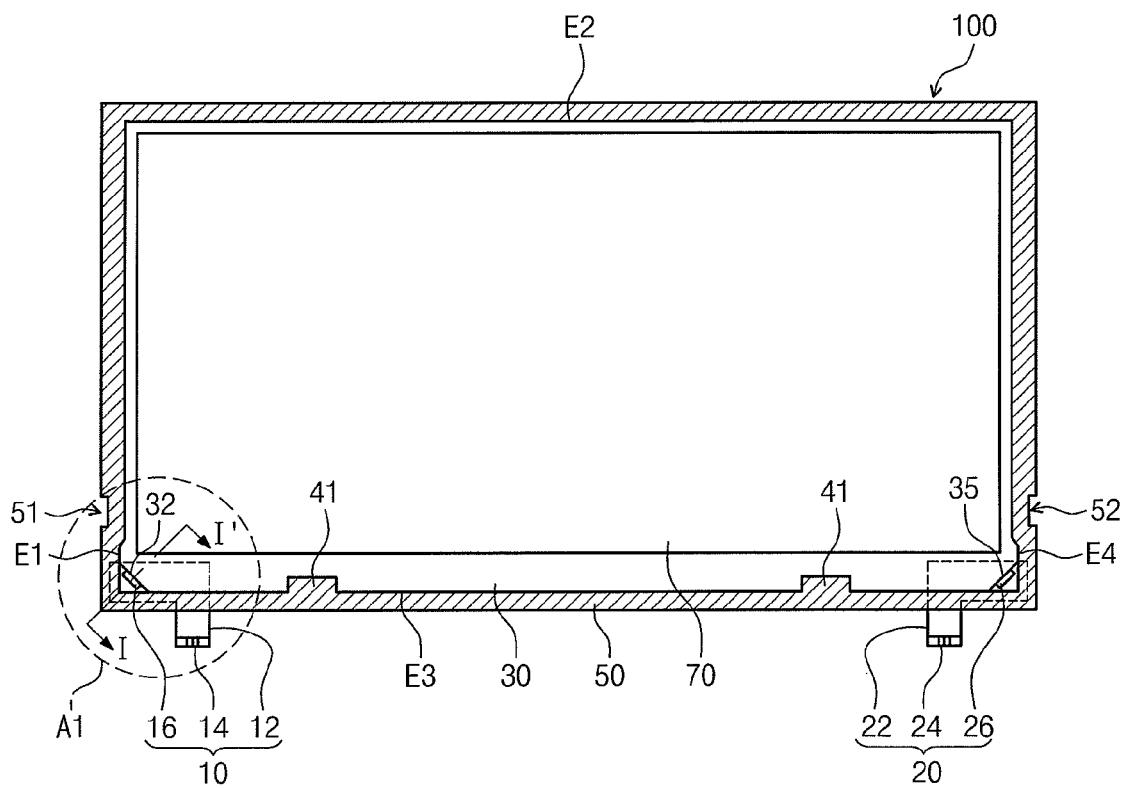
FIG. 1A is a plan view showing a backlight assembly according to an exemplary embodiment of the present invention.
Figure 1B:
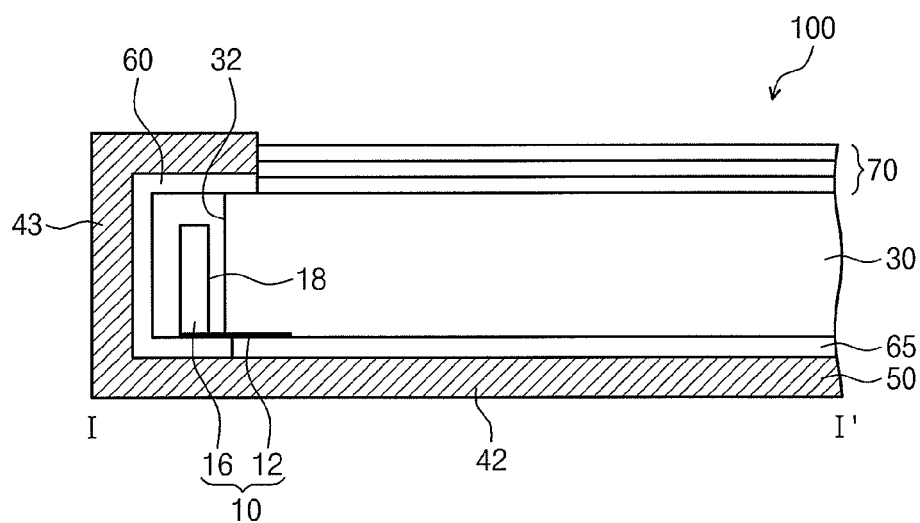
FIG. 1B is a cross-sectional view taken along a line I-I of FIG. 1.

FIG. 1A is a plan view showing a backlight assembly according to an exemplary embodiment of the present invention and FIG. 1B is a cross-sectional view taken along a line I-I of FIG. 1.

Referring to FIGS. 1A and 1B, a backlight assembly 100 includes a light guide plate 30, a first light source unit 10, a second light source unit 20, a receiving container 50, a reflection plate 65, a back cover 60, and optical sheets 70.

The light guide plate 30 receives light from each of the first and second light source units 10 and 20 and guides the light in a predetermined direction. For example, when the backlight assembly 100 is used as a light source of a liquid crystal display having a liquid crystal display panel, the light guide plate 30 guides the light provided from the first and second light source units 10 and 20 to the liquid crystal display panel.

According to the present exemplary embodiment shown in FIGS. 1A and 1B, the light guide plate 30 includes two chamfered corners. A first light incident surface 32 and a second incident surface 35 respectively correspond to the two corners. In more detail, the light guide plate 30 includes a first side surface E1, a fourth side surface E4 facing the first side surface E1, a second side surface E2 connected between the first side surface E1 and the fourth side surface E4, and a third side surface E3 facing the second side surface. The first light incident surface 32 is formed by chamfering a corner where the first side surface E1 meets the third side surface E3, and the second incident surface 35 is formed by chamfering a corner where the third side surface E3 meets the fourth side surface E4.

The first light source unit 10 is accommodated in the receiving container 50, and the light generated by the first light source unit 10 is provided to the light guide plate 30 through the first light incident surface 32.

The first light source unit 10 includes a first light source 16, a first circuit wiring part 12, and a first connector 14. According to an exemplary embodiment, the first circuit wiring part 12 may be a flexible printed circuit board or a printed circuit board. The first light source 16 faces the first light incident surface 32 and includes a light emitting surface 18 substantially parallel to the first light incident surface 32. In addition, the first light source 16 may be a light emitting diode. The first light source unit 10 may include a plurality of first light sources 16.

The first circuit wiring part 12 is electrically connected to the first light source 16 and a power supply (not shown) to transmit a power source voltage from the power supply to the first light source 16. In addition, a portion of the first circuit wiring part 12 is disposed under the light guide plate 30. An end of the first circuit wiring part 12 is extends to the exterior of the receiving container 50 through a withdrawal recess (not shown) formed in the receiving container 50.

The first connector 14 is coupled to the end of the first circuit wiring part 12 that is withdrawn to the exterior, to facilitate a connection of the first circuit wiring part 12 with the power supply via the first connector 14 without performing a separate soldering process.

The second light source unit 20 is accommodated in the receiving container 50, and the light generated by the second light source unit 20 is provided to the light guide plate 30 through the second incident surface 35.

The second light source unit 20 includes a second light source 26, a second circuit wiring part 22, and a second connector 24. The second light source 26, the second circuit wiring part 22, and the connector 24 respectively have the same structure as the first light source 16, the first circuit wiring part 12, and the first connector 14.

The receiving container 50 includes a bottom 42 and sidewalls 43 extended from the bottom 42 to receive the first and second light source units 10 and 20 and the light guide plate 30. In addition, the receiving container 50 may further include a guide portion 41 extended from an upper portion of at least one sidewall of the sidewalls 43 to secure the light guide plate 30 disposed below the guide portion 41.

The reflection plate 65 includes a material, such as polyethylene terephthalate (PET) or aluminum, to reflect light. The reflection plate is disposed between the bottom 42 and the light guide plate 30. Accordingly, light traveling to the bottom 42 from the first light source 16 may be provided to the light guide plate 30 after being reflected by the reflection plate 65, thereby increasing the amount of the light provided to the light guide plate 30.

The back cover 60 has a square bracket shape (e.g., a U-shape) to surround the first light source 16. Similar to the reflection plate 65, the back cover 60 may include a material that reflects the light to increase the amount of the light provided to the light guide plate 30.

The optical sheets 70 are disposed on the light guide plate 30. The optical sheets 70 may include at least one prism sheet and at least one diffusion sheet to condense the light exiting from the light guide plate 30, thereby improving a brightness at the front of the display apparatus.

In addition, although not shown in FIGS. 1A and 1B, the backlight assembly 100 may further include a diffusion plate disposed between the light guide plate 30 and the optical sheets 70 to diffuse the light exiting from the light guide plate 30.

Figure 5A:
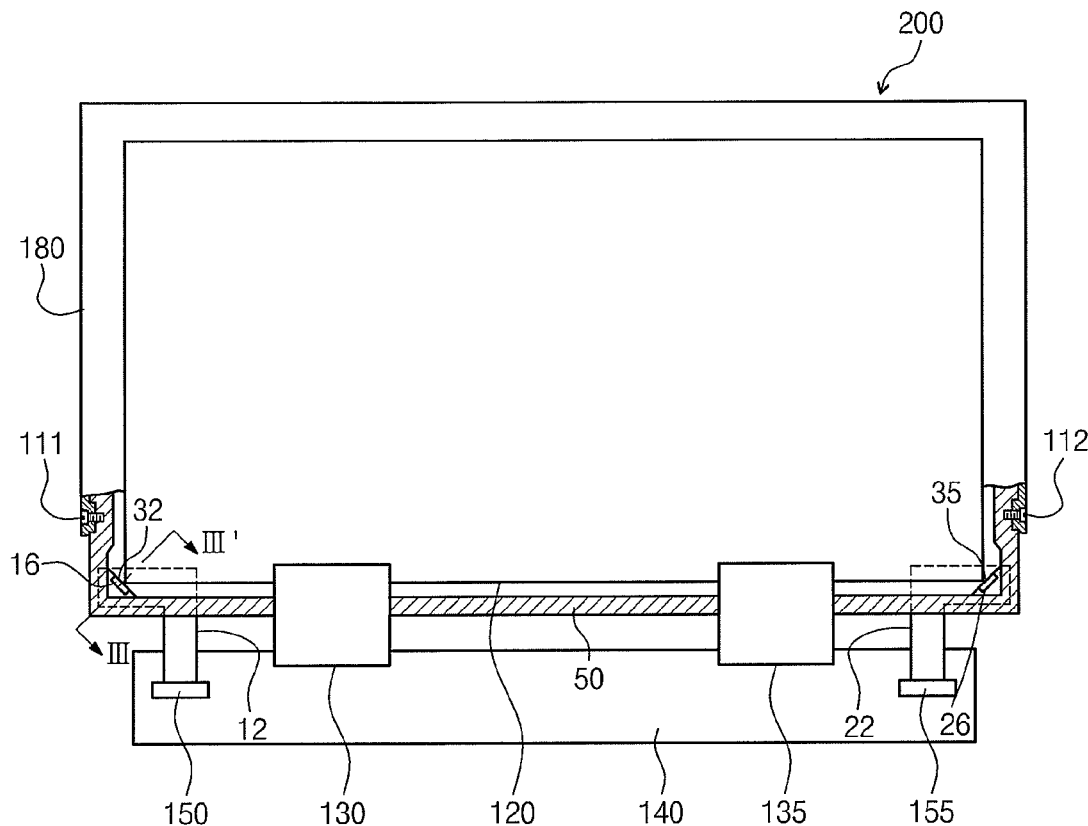
FIG. 5A is a plan view showing a display apparatus according to an exemplary embodiment of the present invention.

A portion of the sidewall substantially parallel to the first side surface E1 among the sidewalls 43 is partially removed to form a first user hole 51, and a portion of the sidewall substantially parallel to the fourth side surface E4 among the sidewalls 43 is partially removed to form a second user hole 52. As shown in FIG. 5A, in the case that the backlight assembly 100 is used as a light source of a liquid crystal display 200, the first and second user holes 51 and 52 provide a space into which a coupling member (e.g., screw 111) that couples a cover member 180 to the receiving container 50 is inserted and separates the coupling member from the light guide plate 30. As a result, the light guide plate 30 may be prevented from being damaged by the coupling member. The structure of the first and second user holes 51 and 52 and the structure of the light guide plate 30 as it corresponds to the first and second user holes 51 and 52 is described in further detail below.

Figure 2:
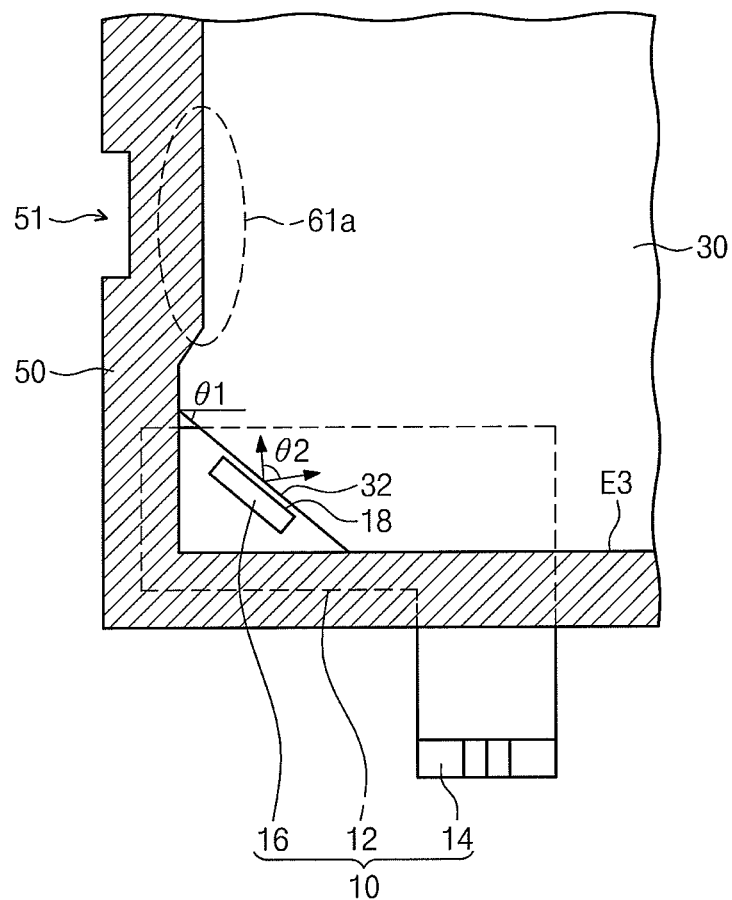
FIG. 2 is a partially enlarged view showing an area A1 of FIG. 1.

FIG. 2 is a partially enlarged view showing a first area A1 of FIG. 1.

Referring to FIG. 2, the light emitting surface 18 of the first light source 16 faces the first light incident surface 32 of the light guide plate 30, and an acute angle θ1 formed between the third side surface E3 and the first light incident surface 32 is in a range of about 30 degrees to about 60 degrees when viewed in a plan view. In addition, although not shown in FIG. 2, an acute angle formed between the light incident surface of the second light source 26 (refer to FIG. 1A) and the third side surface E3 is in a range of about 30 degrees to about 60 degrees.

In the case that the first light source 16 is a light emitting diode, an emission angle of the light traveling in a layer of air through the first light emitting surface 18 has a symmetrical shape with reference to an imaginary line vertically passing through a center of the light emitting surface 18. More particularly, most of the light exiting through the light emitting surface 18 travels in an angle range of about +60 degrees to about −60 degrees with reference to the imaginary line vertically passing through a center of the light emitting surface 18. However, in the case that the light exiting through the first light emitting surface 18 is provided to the light guide plate 30 and the light guide plate 30 is formed of polymethylmethacrylate (PMMA) having a refractive index of about 1.5 that is larger than a refractive index of air, the emission angle θ2 of the light traveling to the light guide plate 30 from a point on the first light incident surface 32 may be in a range of about +42.5 degrees to about −42.5 degrees.

In other words, the emission angle θ2 may vary according to the refractive index of the light guide plate 30, but the emission angle of the light generated by the first light source 16 and provided to the light guide plate 30 through the first light incident surface 32 may be limited to a specific range of angles. Thus, the acute angle θ1 is controlled such that the light may be uniformly provided to the entire or substantially the entire light guide plate 30 through the first light incident surface 32. Accordingly, when the acute angle θ1 is controlled in a range of about 30 degrees to about 60 degrees, the light generated by the first and second light source units 10 and 20 may be uniformly provided to the entire or substantially the entire light guide plate 30.

A portion of the light guide plate 30 is removed corresponding to the first user hole 51 to form a coupling recess 61a. Referring to FIG. 5A, as a result of the formation of the first user hole 51 and the coupling recess 61a, although the receiving container 50 is coupled to the cover member 180 by a screw 111 accommodated in the first user hole 51, the light guide plate 30 may be prevented from being damaged due to the contact between the screw and the light guide plate 30. The structure of the coupling recess 61a is described in further detail with reference to FIGS. 9A and 9B.

Figure 9A:
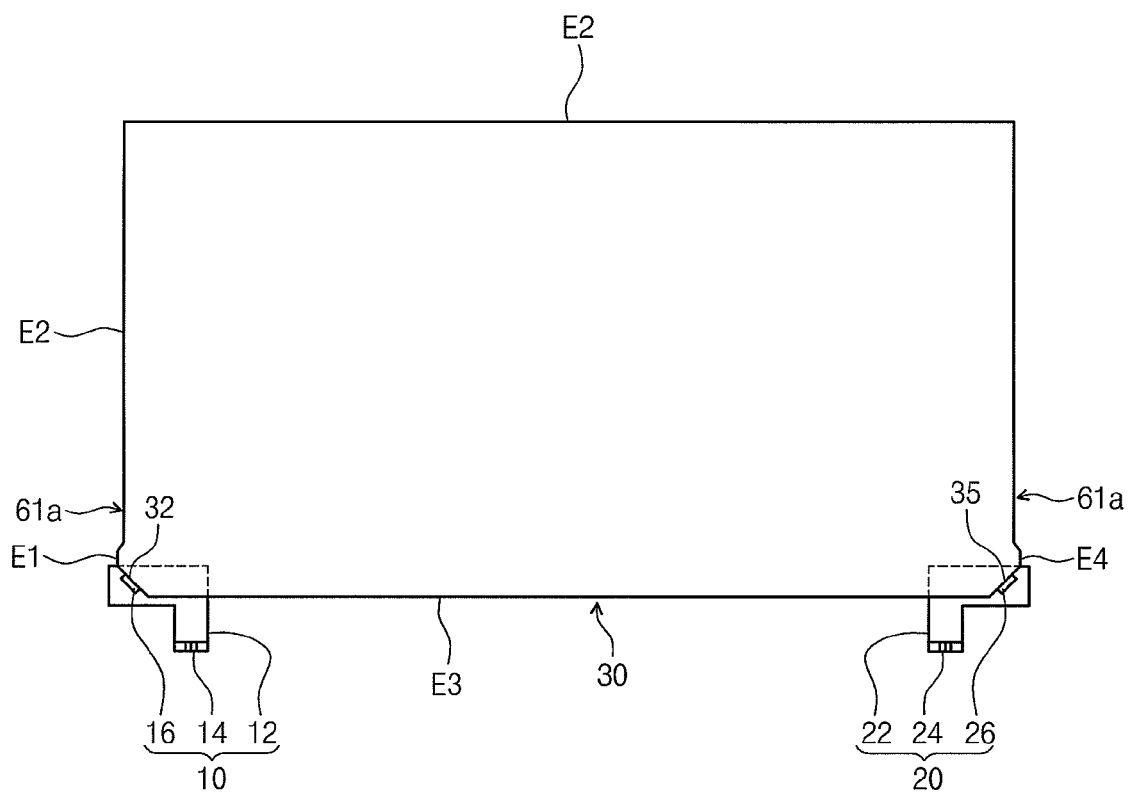
FIG. 9A is a plan view showing a light guide plate, a first light source unit, and a second light source unit of FIG. 1A.
Figure 9B:
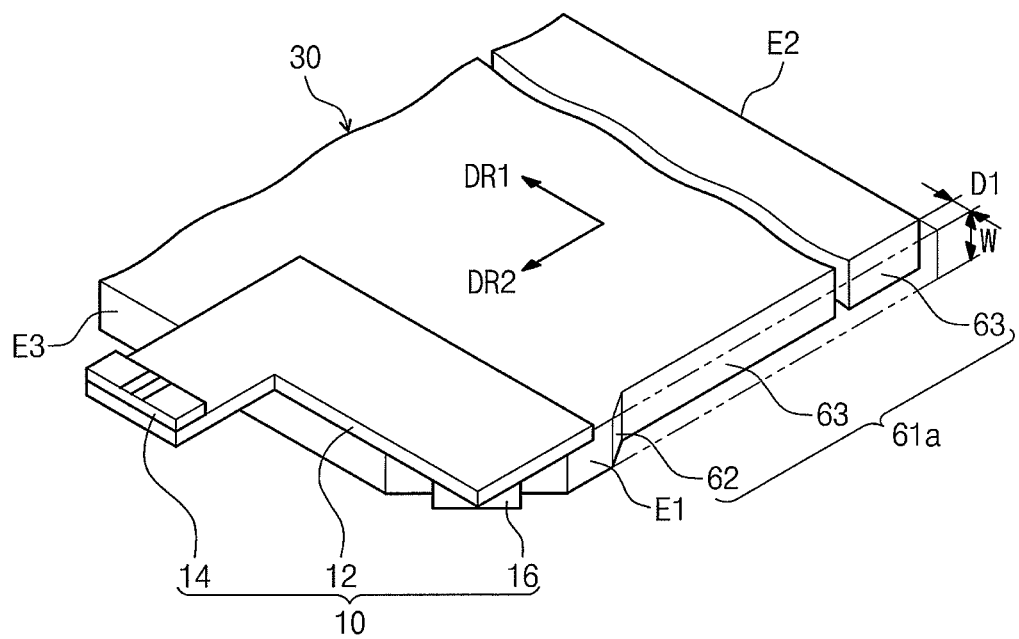
FIG. 9B is a partial perspective view showing the light guide plate, the first light source unit, and the second light source unit of FIG. 9A.

FIG. 9A is a plan view showing the light guide plate 30, the first light source unit 10, and the second light source unit 20 of FIG. 1A and FIG. 9B is a partial perspective view showing the light guide plate 30, the first light source unit 10, and the second light source unit 20. In more detail, FIG. 9B shows mainly the first side surface E1 of the light guide plate 30 viewed from a rear surface of the light guide plate 30. According to an exemplary embodiment, the second side surface E2 of the light guide plate 30 has the same structure as the first side surface E1.

Referring to FIGS. 9A and 9B, the light guide plate 30 includes the first side surface E1 connected to the first light incident surface 32 and being substantially parallel to a second direction D2. In addition, a portion of the first side surface E1, which has a width W equal to a thickness of the light guide plate 30, is removed in a first direction D1 by a first depth D, which is substantially perpendicular to the second direction D2, thereby forming the coupling recess 61a.

In more detail, the coupling recess 61a is defined by an inner side surface 62 and a bottom surface 63 connected to the inner side surface 62. The inner side surface 62 and the bottom surface 63 are spaced apart from the first side surface E1. As shown in FIG. 9B, according to an exemplary embodiment, the bottom surface 63 is substantially parallel to the second direction D2 and the inner side surface 62 is inclined with respect to the first direction D1 and the second direction D2.

In addition, the bottom surface 63 is connected to the inner side surface 62 and extended in the second direction D2 to make contact with the second side surface E2. The coupling recess 61a in the first side surface E1 is spaced apart from the first light incident surface 32 and extends to the second side surface E2.

Figure 3:
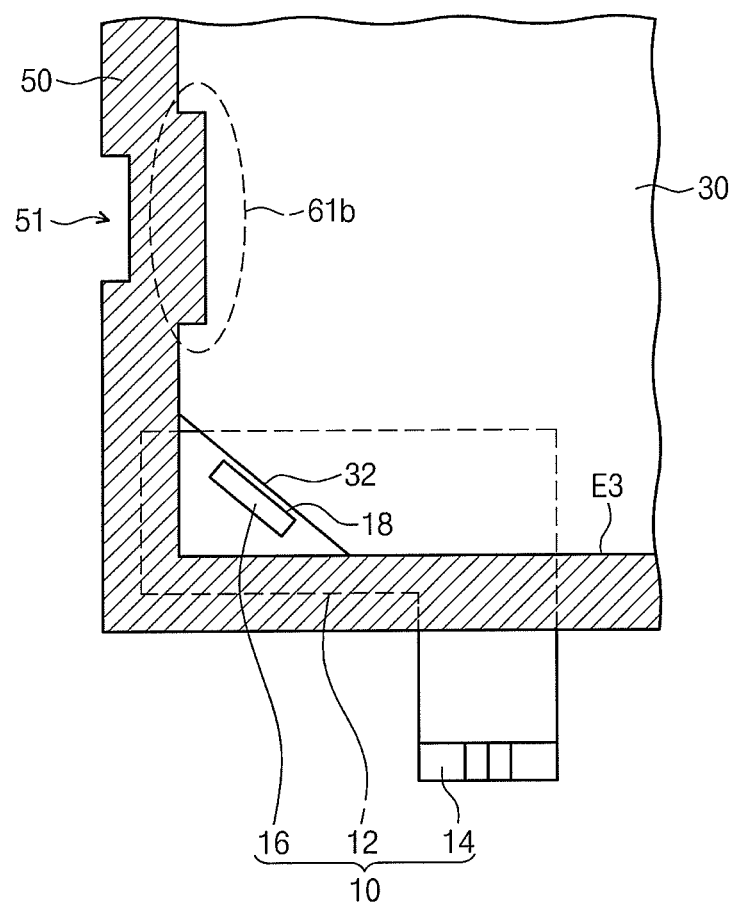
FIG. 3 is a plan view showing a backlight assembly according to an exemplary embodiment of the present invention.

FIG. 3 is a plan view showing a backlight assembly according to an exemplary embodiment of the present invention. According to an exemplary embodiment, a backlight assembly has the same structure and function as the backlight assembly shown in FIGS. 1A, 1B, 2, 9A, and 9B except for a structure of the coupling recess 61b thereof. In FIG. 3, the same reference numerals denote the same or similar elements as those in FIGS. 1A, 1B, 2, 9A, and 9B.

Referring to FIGS. 1A and 3, the coupling recess 61b is formed by removing a portion of the light guide plate 30 corresponding to the position of the first user hole 51, but the surfaces that define the coupling recess 61b are different from those of the coupling recess 61a shown in FIG. 2. The structure of the coupling recess 61b is described in detail with reference to FIG. 10.

Figure 10:
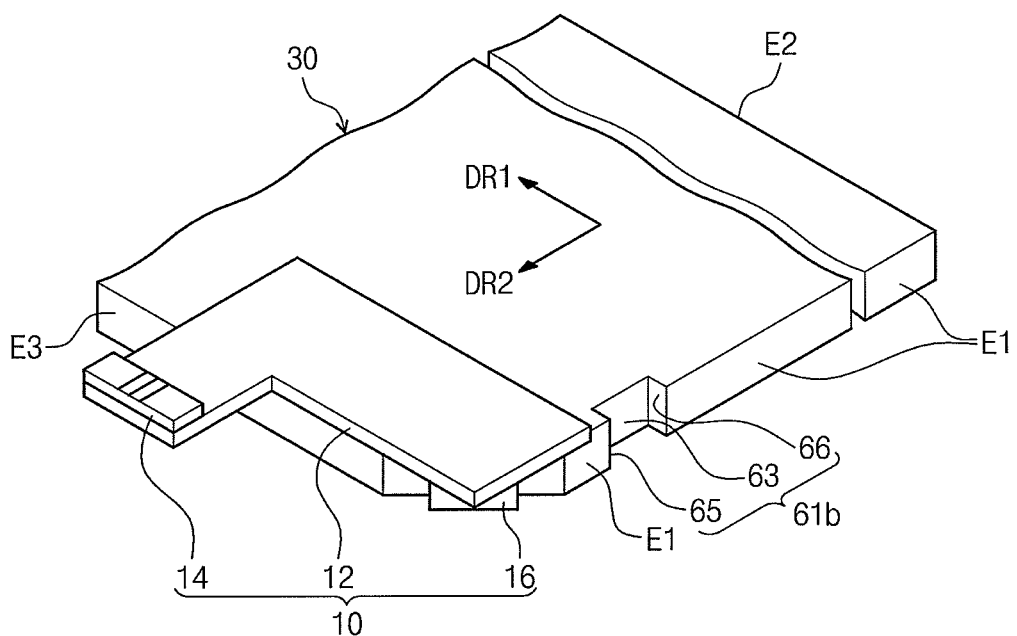
FIG. 10 is a partial perspective view showing a light guide plate and a first light source unit of FIG. 3.

FIG. 10 is a partial perspective view showing the light guide plate 30 and the first light source unit 10 of FIG. 3. In more detail, FIG. 10 shows mainly the first side surface E1 of the light guide plate 30 viewed from a rear surface of the light guide plate 30.

Referring to FIG. 10, like the coupling recess 61a shown in FIG. 9B, a portion of the first side surface E1 of the light guide plate 30, which has a width equal to a thickness of the light guide plate 30, is removed by a first depth, to thereby form the coupling recess 61b. The surfaces that define the coupling recess 61b are different from the surfaces that define the coupling recess 61a shown in FIG. 9.

In more detail, the coupling recess 61b is defined by a first inner side surface 65, a second inner side surface 66 facing the first inner side surface 65, and a bottom surface 63 connected between the first inner side surface 65 and the second inner side surface 66. The bottom surface 63 is substantially parallel to the second direction D2, and each of the first and second inner side surfaces 65 and 66 is substantially parallel to a first direction D1, which is substantially perpendicular to the second direction D2. In addition, different from the coupling recess 61a shown in FIG. 9B, the bottom surface 63 is connected to the second inner side surface 66 and does not make contact with the second side surface E2.

Figure 11:
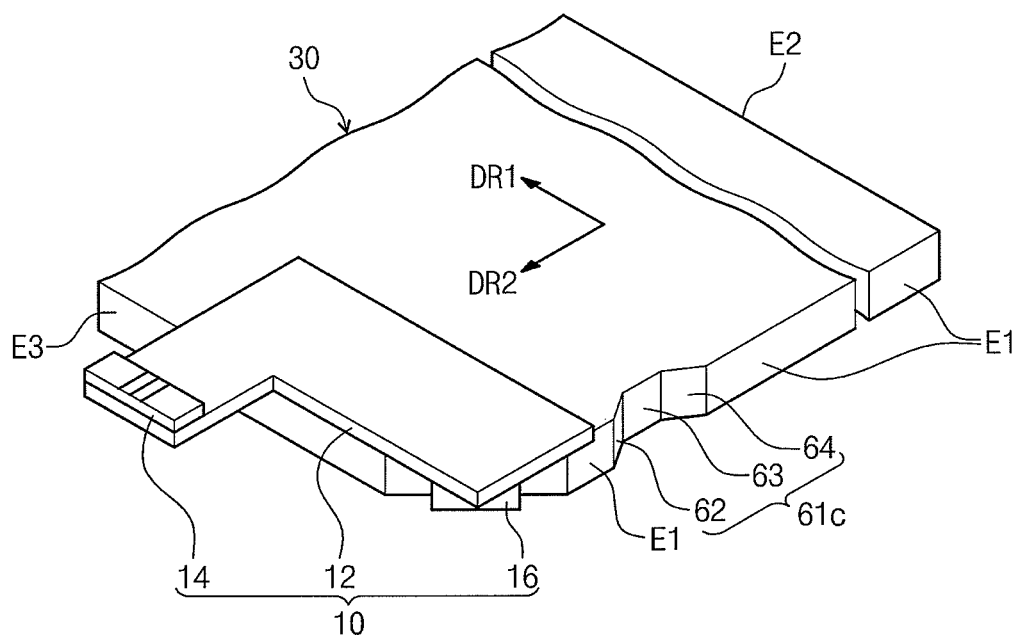
FIG. 11 is a partial perspective view showing a light guide plate and a first light source unit according to an exemplary embodiment of the present invention.

As shown in FIG. 10, the first inner side surface 65 and the second inner side surface 66 are perpendicular to the bottom surface 63. Alternatively, referring to FIG. 11, which is a partial perspective view showing a light guide plate 30 and a first light source unit 10 according to another exemplary embodiment, the coupling recess 61c is defined by the bottom surface 63, the first inner side surface 62, and the second inner side surface 64. As can be seen, the first inner side surface 62 and the second inner side surface 64 are at an oblique angle, for example, an obtuse angle, with respect to the bottom surface 63. The first and second inner side surfaces 62, 64 are inclined with respect to the first and second directions D1 and D2.

Figure 4A:
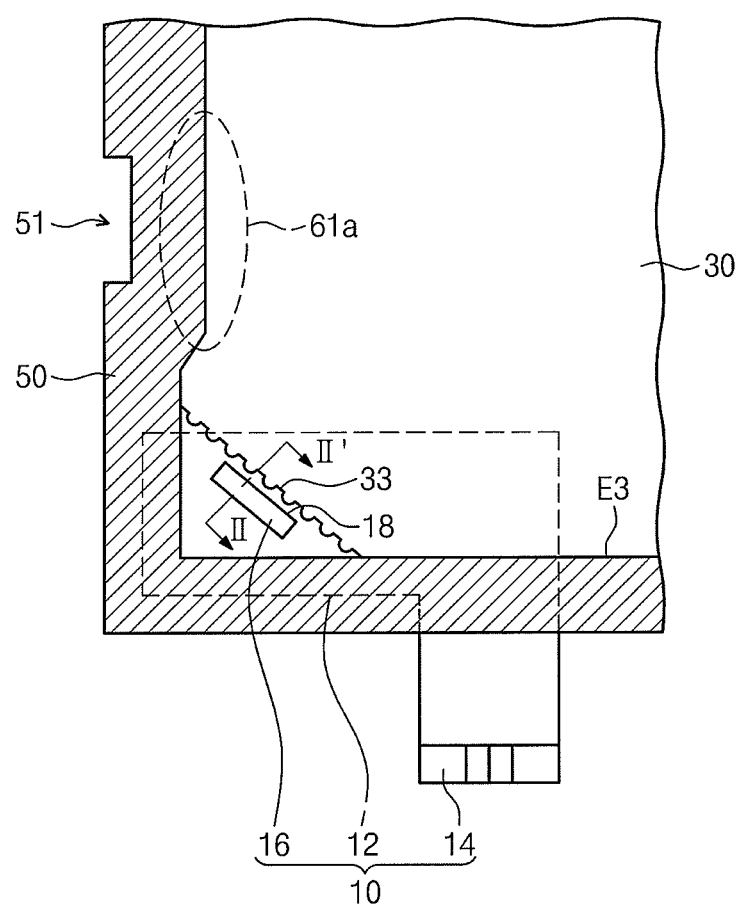
FIG. 4A is a plan view showing a backlight assembly according to an exemplary embodiment of the present invention.
Figure 4B:
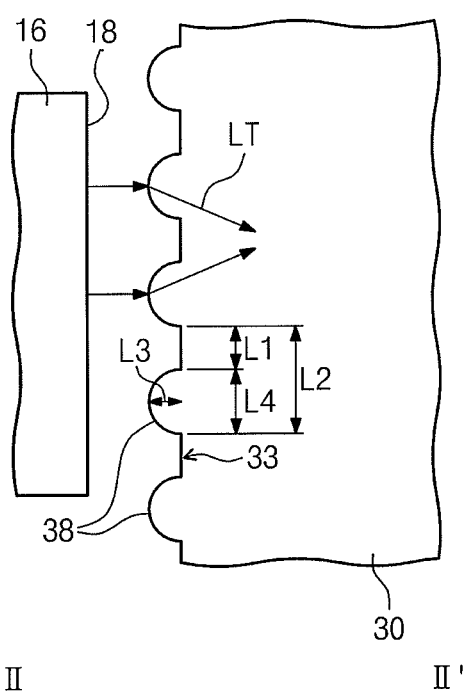
FIG. 4B is a cross-sectional view taken along a line II-II' of FIG. 4A.

FIG. 4A is a plan view showing a backlight assembly according to an exemplary embodiment of the present invention and FIG. 4B is a cross-sectional view taken along a line II-II' of FIG. 4A. The backlight assembly shown in FIGS. 4A and 4B has the same structure and function as the backlight assembly shown in FIGS. 1A, 1B, and 2 except for a structure of a first light incident surface 33.

Referring to FIGS. 4A and 4B, the first light incident surface 33 includes a plurality of protrusions 38 protruded from the first light incident surface 33. The protrusions 38 diffuse the light that exits from the light emitting surface 18 and is provided to the light guide plate 30 through the first light incident surface 33. As a result, the emission angle θ2 from FIG. 2 may be increased, and the light may be uniformly provided to the entire or substantially the entire light guide plate 30 by the protrusions 38.

According to the exemplary embodiment shown in FIGS. 4A and 4B, a distance L1 between two protrusions adjacent to each other may be about 160 micrometers, and the protrusions 38 have a pitch L2 of about 360 micrometers. In addition, each of the protrusions is protruded from the first light incident surface 33 to have a height L3 of about 100 micrometers and a length L4 of about 200 micrometers.

The pitch L2 may be in a range of about 200 micrometers to about 600 micrometers according to the structure of other elements, such as, the size of the first light incident surface 33 or the light emitting surface. In addition, when the pitch L2 is controlled, the distance L1 and the height L3 may be varied corresponding to the variation of the pitch L2.

Figure 5B:
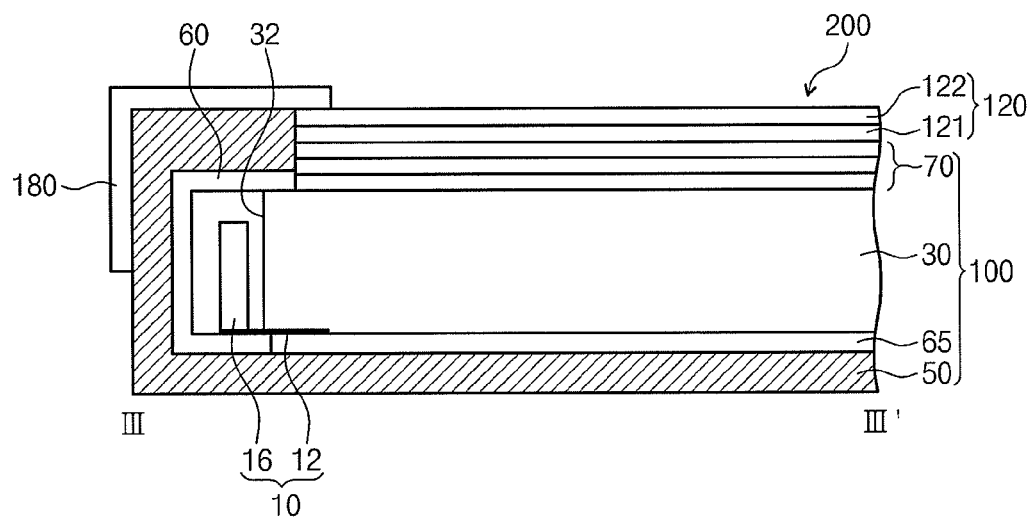
FIG. 5B is a cross-sectional view taken along a line III-III' of FIG. 5A.

FIG. 5A is a plan view showing a display apparatus according to an exemplary embodiment of the present invention and FIG. 5B is a cross-sectional view taken along a line III-III' of FIG. 5A. A display apparatus 200 shown in FIGS. 5A and 5B includes the backlight assembly described with reference to FIGS. 1A, 1B, and 2.

Referring to FIGS. 5A and 5B, the display apparatus 200 includes a backlight assembly 100, a display panel 120, and a driving part 140. According to an exemplary embodiment, the display apparatus 200 may be a liquid crystal display and the display panel 120 may be a liquid crystal display panel that receives the light from the backlight assembly 100 to display an image.

The display panel 120 includes a first substrate 121, a second substrate 122 facing the first substrate 121, and a liquid crystal layer (not shown) interposed between the first substrate 121 and the second substrate 122.

The first substrate 121 may include a plurality of pixel electrodes (not shown) and a plurality of thin film transistors. According to an embodiment, each thin film transistors is electrically connected to a respective pixel electrode, and each transistor switches a driving signal applied to a corresponding pixel electrode. When the thin film transistor is turned on, the corresponding pixel electrode receives a data signal provided from a data driver. In addition, the second substrate 122 may include color filter layers positioned corresponding to the pixel electrodes, respectively, and an opposite electrode that forms an electric field with the pixel electrodes to control alignment of liquid crystal molecules of the liquid crystal layer.

The driving part 140 is electrically connected to an input pad part (not shown) of the display panel 120 by a first tape carrier package 130 and a second tape carrier package 135. The driving part 140 generates a driving signal to drive the display panel 120 and applies the driving signal to the display panel 120 through the first and second tape carrier packages 130 and 135.

In addition, the driving part 140 applies a power source voltage to the first light source 16 and the second light source 26. The first and second light sources 16 and 26 use the power source voltage to emit the light. In more detail, referring to FIGS. 1A and 5A, the first connector 14 electrically connected to the first circuit wiring part 12 is coupled to a first power supply 150 included in the driving part 140, so that the first light source 16 may receive the power source voltage output from the first power supply 150. Similarly, the second connector 24 electrically connected to the second circuit wiring part 22 is coupled to a second power supply 155 included in the driving part 140, so the second light source 26 may receive the power source voltage output from the second power supply 155.

The display apparatus 200 may further include a cover member 180, and the cover member 180 is coupled to the sidewalls of the receiving container 50 to cover the display panel 120 except for the area where the image is displayed. More particularly, a first screw 111 and a second screw 112 are respectively inserted into the first and second user holes 51 and 52 described with reference to FIGS. 1A, 1B, and 2 to couple the coupling member 180 to the receiving container 50.

Figure 6:
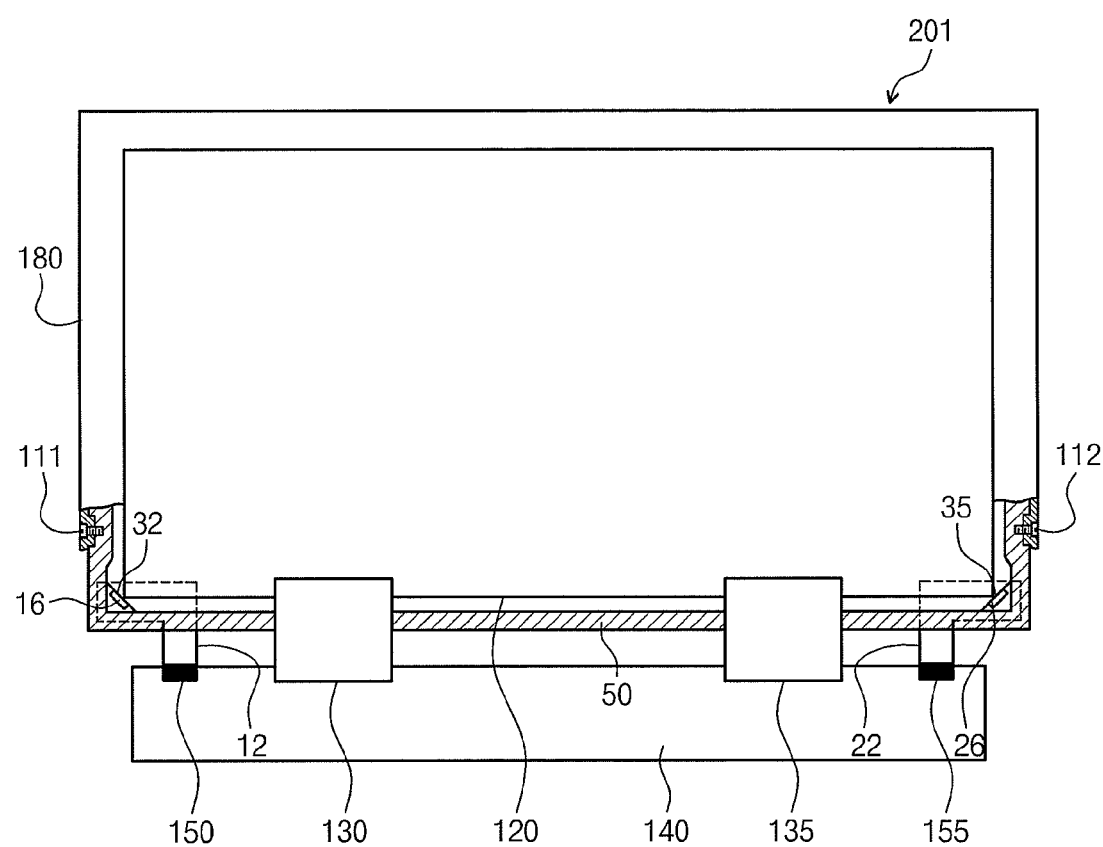
FIG. 6 is a plan view showing a display apparatus according to an exemplary embodiment of the present invention.

FIG. 6 is a plan view showing a display apparatus according to an exemplary embodiment of the present invention. According to the exemplary embodiment shown in FIG. 6, the display apparatus has the same or similar structure and function as those of the display apparatus shown in FIGS. 5A and 5B except for the manner in which the first and second circuit wiring parts 12 and 22 are electrically connected to the driving part 140. Accordingly, in FIG. 6, the same reference numerals denote the same or similar elements as in FIGS. 5A and 5B.

Referring to FIG. 6, the first circuit wiring part 12 extended outside the receiving container 50 has a terminal at the end thereof instead of the first connector 14 shown in FIG. 1A, and the terminal of the first circuit wiring part 12 is soldered to the first power supply 150 of the driving part 140. As a result, the first light source 16 may receive the power source voltage output from the first power supply 150 to emit the light.

Similarly, the second circuit wiring part 22 extended outside the receiving container 50 has a terminal at the end thereof instead of the second connector 24 shown in FIG. 1A, and the terminal of the second circuit wiring part 22 is soldered to the second power supply 155 of the driving part 140. As a result, the second light source 26 may receive the power source voltage output from the second power supply 155 to emit the light.

Figure 7:
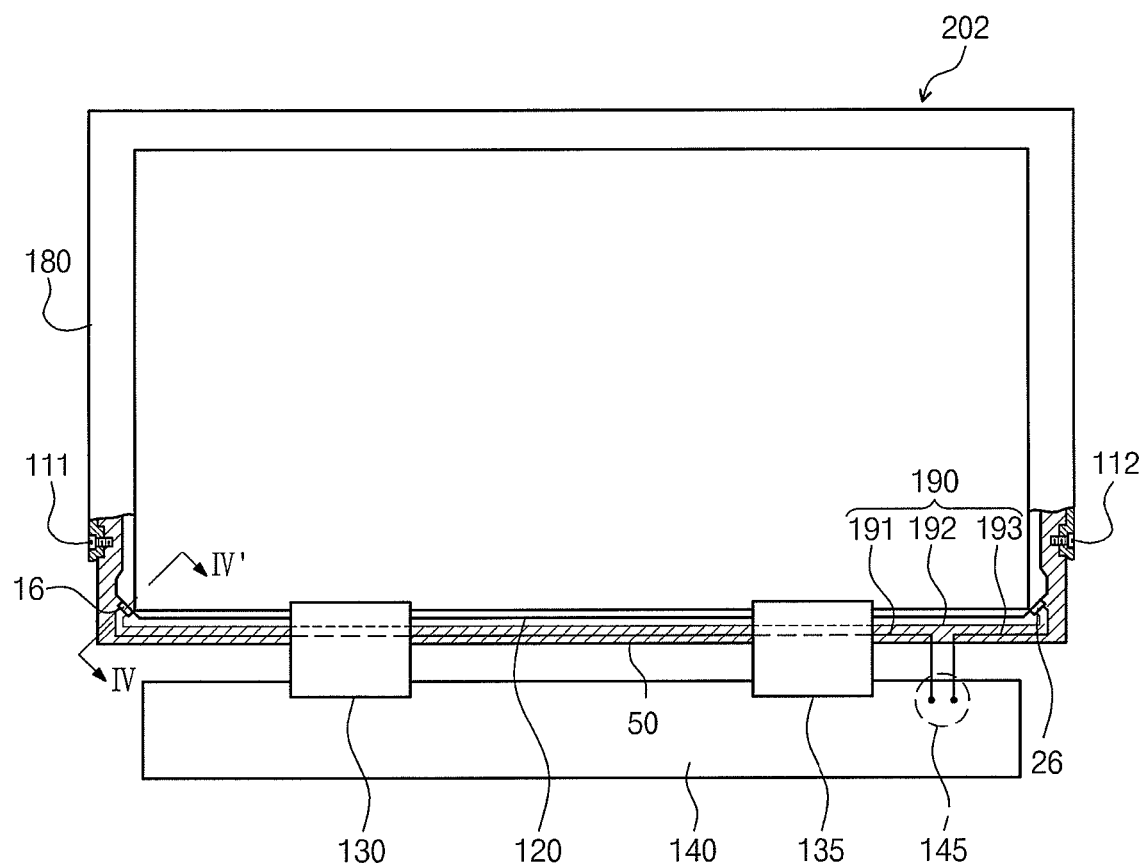
FIG. 7 is a plan view showing a display apparatus according to an exemplary embodiment of the present invention.
Figure 8:
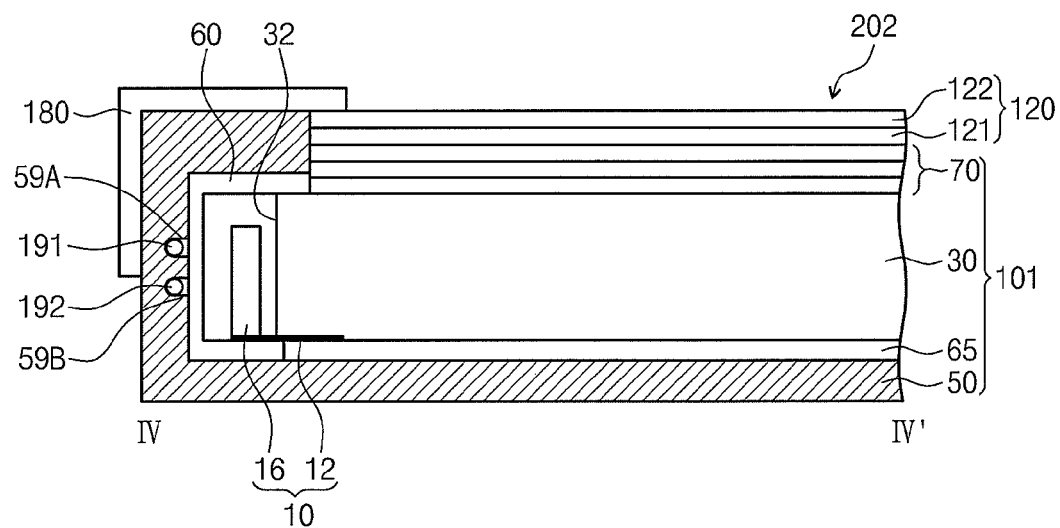
FIG. 8 is a cross-sectional view taken along a line IV-IV' of FIG. 7.

FIG. 7 is a plan view showing a display apparatus according to an exemplary embodiment of the present invention and FIG. 8 is a cross-sectional view taken along a line IV-IV' of FIG. 7. A display apparatus shown in FIGS. 7 and 8 has the same or similar structure and function as those of the display apparatus shown in FIGS. 5A and 5B except for the manner in which the first and second light sources 16 and 26 are electrically connected to the driving part 140. Accordingly, in FIGS. 7 and 8, the same reference numerals denote the same or similar elements as in FIGS. 5A and 5B.

Referring to FIG. 7, the first light source 16 and the second light source 26 are electrically connected to a power supply 145 included in the driving part 140 by lead wires 190 instead of using the first and second connectors 14 and 24 and the first and second circuit wiring parts 12 and 22 shown in FIG. 1A. In more detail, the lead wires 190 include a first lead wire 191, a second lead wire 192, and a third lead wire 193. The first lead wire 191 electrically connects the first light source 16 with the power supply 145, the second lead wire 192 electrically connects the first light source 16 with the second light source 26, and the third lead wire 193 electrically connects the second light source 26 with the power supply 145.

The lead wires 190 are accommodated in the receiving container 50, and an end of each of the lead wires 190 is extended outside the receiving container 50 and electrically connected to the power supply 145.

Referring to FIG. 8, the receiving container 50 may include a first recess 59A in which the first lead wire 191 is accommodated and a second recess 59B in which the second lead wire 192 is accommodated. Each of the first and second recesses 59A and 59B opens outwardly, so that the first and second lead wires 191 and 192 may be easily inserted into the first and second recesses 59A and 59B, respectively.

Figure 12A:
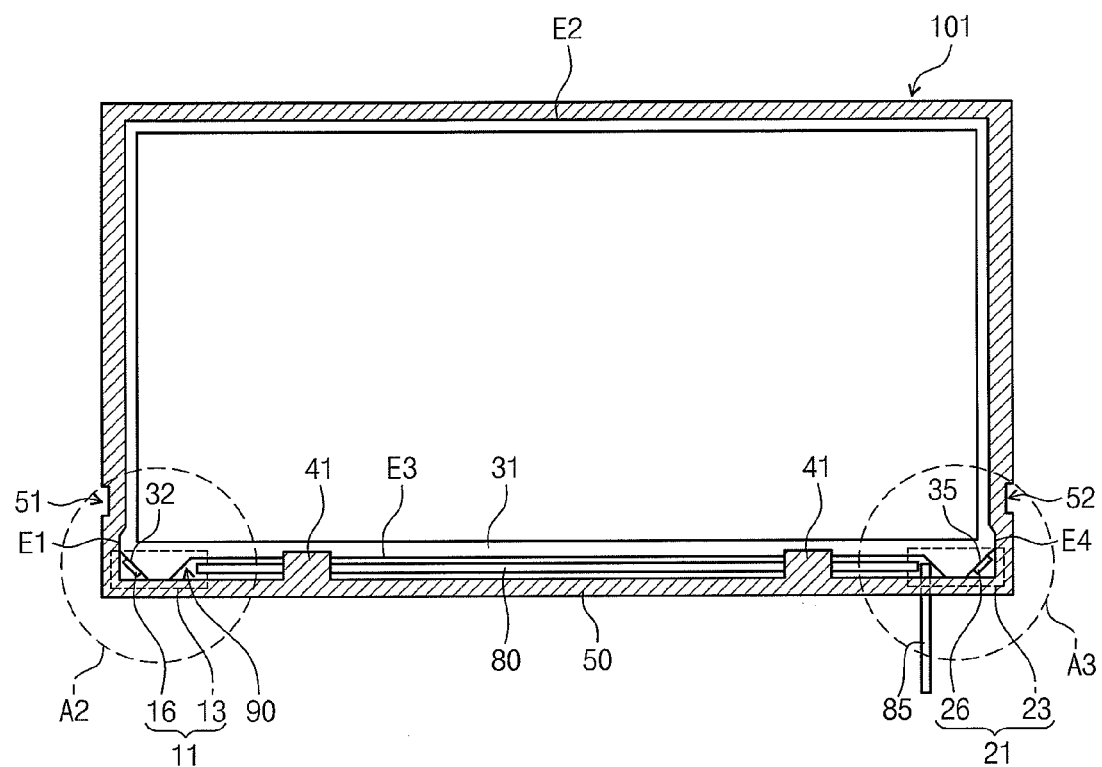
FIG. 12A is a plan view showing a backlight assembly according to an exemplary embodiment of the present invention.
Figure 12B:
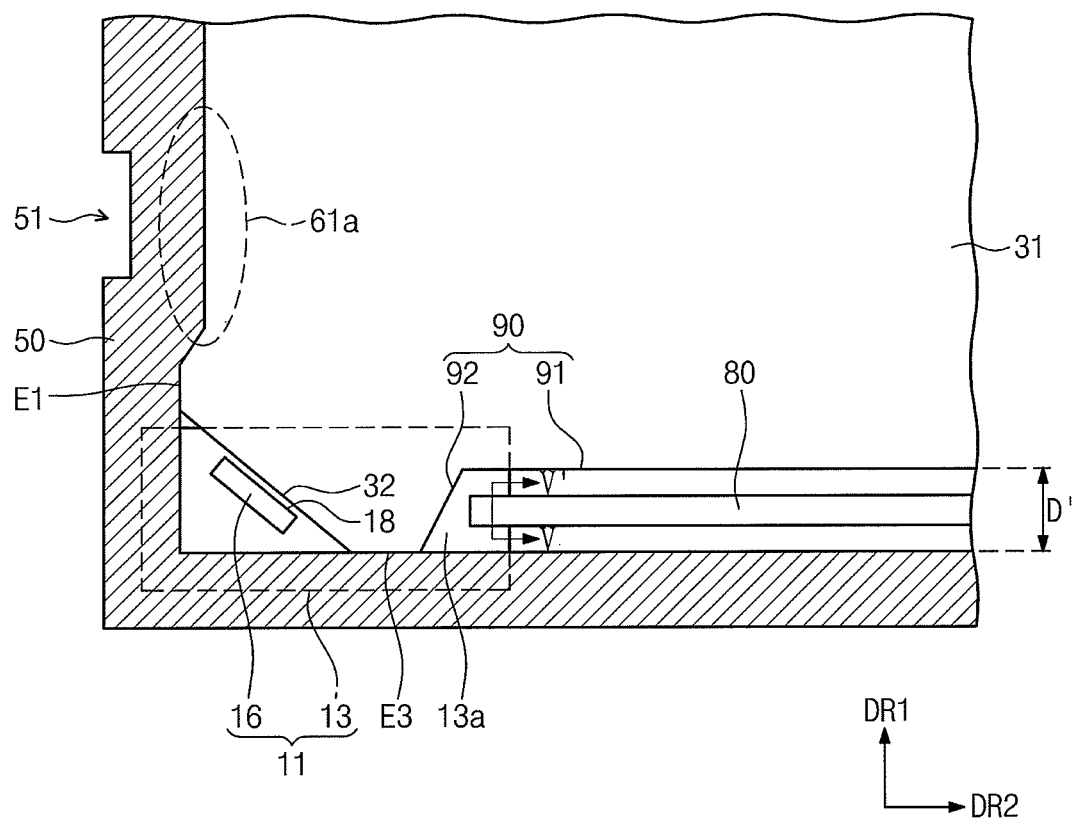
FIG. 12B is a partially enlarged view showing an area A2 of FIG. 12A.
Figure 12C:
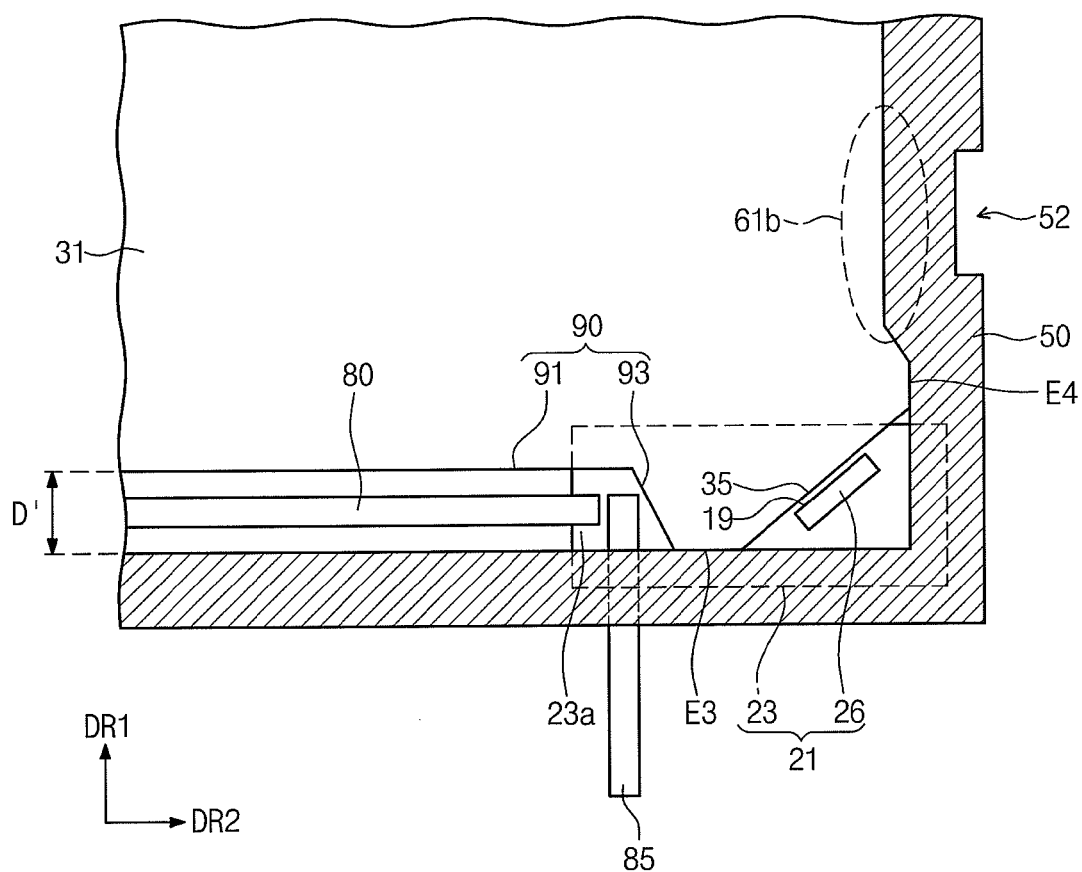
FIG. 12C is a partially enlarged view showing an area A3 of FIG. 12A.
Figure 12D:
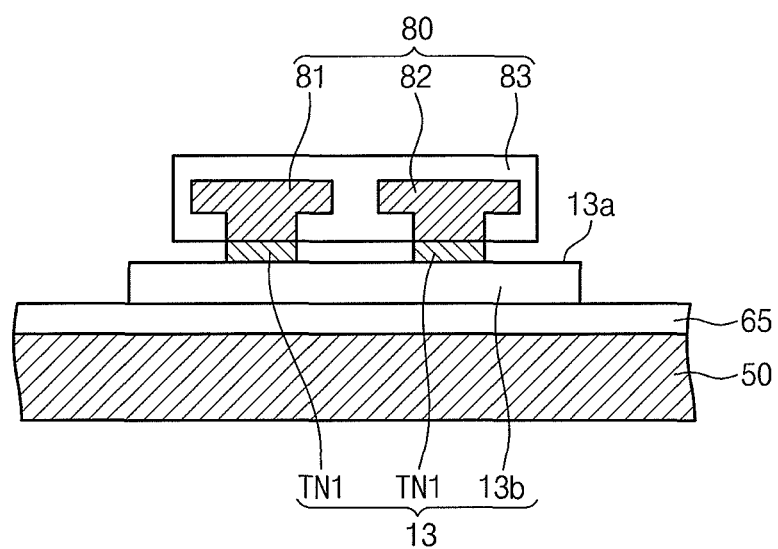
FIG. 12D is a cross-sectional view taken along a line V-V' of FIG. 12B.

FIG. 12A is a plan view showing a backlight assembly according to an exemplary embodiment, FIG. 12B is a partially enlarged view showing a second area A2 of FIG. 12A, FIG. 12C is a partially enlarged view showing a third area A3 of FIG. 12A, and FIG. 12D is a cross-sectional view taken along a line V-V' of FIG. 12B.

Referring to FIG. 12A, the light guide plate 31 includes two chamfered corners so that the light guide plate 31 includes a first light incident surface 32 and a second light incident surface 35, which are formed by chamfering the two corners.

The first light source unit 11 includes a first circuit substrate 13 and a first light source 16 mounted on the first circuit substrate 13 and the second light source unit 21 includes a second circuit substrate 23 and a second light source 26 mounted on the second circuit substrate 23. The first circuit substrate 13 and the second circuit substrate 23 may each be a flexible printed circuit board or a printed circuit board.

A first wiring part 80 includes a first end electrically connected to the first circuit substrate 13 and a second end electrically connected to the second circuit substrate 23. In addition, a second wiring part 85 includes a first end electrically connected to the second circuit substrate 23 and a second end extended outside the receiving container 50 and electrically connected to a power supply (not shown). As a result, the power source voltage generated by the power supply may be applied to the first and second light sources 16 and 26 through the first and second wiring parts 80 and 85.

Referring to FIG. 12A, according to an embodiment, the light guide plate 31 includes a wiring recess 90 integrally formed with the light guide plate and the first wiring part 80 may be accommodated in the wiring recess 90. Further details of the wiring recess 90 are described with reference to FIGS. 12B and 12C.

In addition, according to an exemplary embodiment, the first and second wiring parts 80 and 85 may be a flexible flat cable (FFC) including a plurality of wires, each of which is coated with an insulating material.

Referring to FIGS. 12B and 12C, the light guide plate 31 includes the third side surface E3 with the wiring recess 90 formed in the third side surface E3. More particularly, a portion of the third side surface E3, which has a width equal to a thickness of the light guide plate 31, is removed in a first direction DR1 by a second depth D', thereby forming the wiring recess 90. The first wiring part 80 is accommodated in the wiring recess 90 and extended in the second direction DR2 in a plan view.

When viewed in a plan view, the wiring recess 90 is defined by a first surface 91 substantially parallel to the second direction DR2, a second surface 92 inclined with respect to the first surface 91 and connected to a first side of the first surface 91, and a third surface 93 inclined with respect to the first surface 91 and connected to a second side of the first surface 91, which is opposite to the first side.

The wiring recess 90 is spaced apart from the first light incident surface 32 and the second light incident surface 35. In more detail, the second surface 92 adjacent to the first light incident surface 32 is spaced apart from the first light incident surface 32 and not directly connected to the first light incident surface 32. The third surface 93 adjacent to the second light incident surface 35 is spaced apart from the second light incident surface 35 and not directly connected to the second light incident surface 35.

A first portion 13a of the first circuit substrate 13 and a second portion 23a of the second circuit substrate 23 may be exposed to the exterior by the wiring recess 90. As a result, connection of the first wiring part 80 to the first circuit substrate 13, and connection of the first wiring part 80 and the second wiring part 85 to the second circuit substrate 23 can be facilitated.

Referring to FIG. 12D, the first circuit substrate 13 includes an insulation film 13b and two first terminals TN1 disposed on the insulation film 13b and spaced apart from each other. Although not shown in detail in FIG. 12D, the two first terminals TN1 are electrically connected to the positive electrode and the negative electrode, respectively, of the first light source 16. The first wiring part 80 includes an insulation member 83 and first and second wires 81 and 82 are coated by the insulation member 83.

The first wire 81 and the second wire 82 are electrically connected to the two first terminals TN1, respectively. According to an exemplary embodiment, the first wire 81 and the second wire 82 may be respectively soldered to the two first terminals TN1. As shown in FIG. 12B, the first portion 13a of the first circuit substrate 13, which is not covered by the light guide plate 31, is soldered to the first wiring part 80, Since the light guide plate does not cover the first portion 13a of the first circuit substrate 13, the soldering process is facilitated.

The first wiring part 80 is soldered to a portion of the second circuit substrate 23, which is not covered by the light guide plate 31. Although not shown in figures, two terminals (not shown) are disposed on the second portion 23a of the second circuit substrate 23, and the two terminals are electrically connected to the first and second wires 81 and 82, respectively, similar to the two first terminals TN1.

A first end of the second wiring part 85 is electrically connected to the second circuit substrate 23, and a second end of the second wiring part 85 extends outside the receiving container 50 and is electrically connected to a power supply (not shown). Consequently, the power source voltage generated by the power supply may be applied to the first and second light sources 16 and 26 through the first and second wiring parts 80 and 85.

Figure 13:
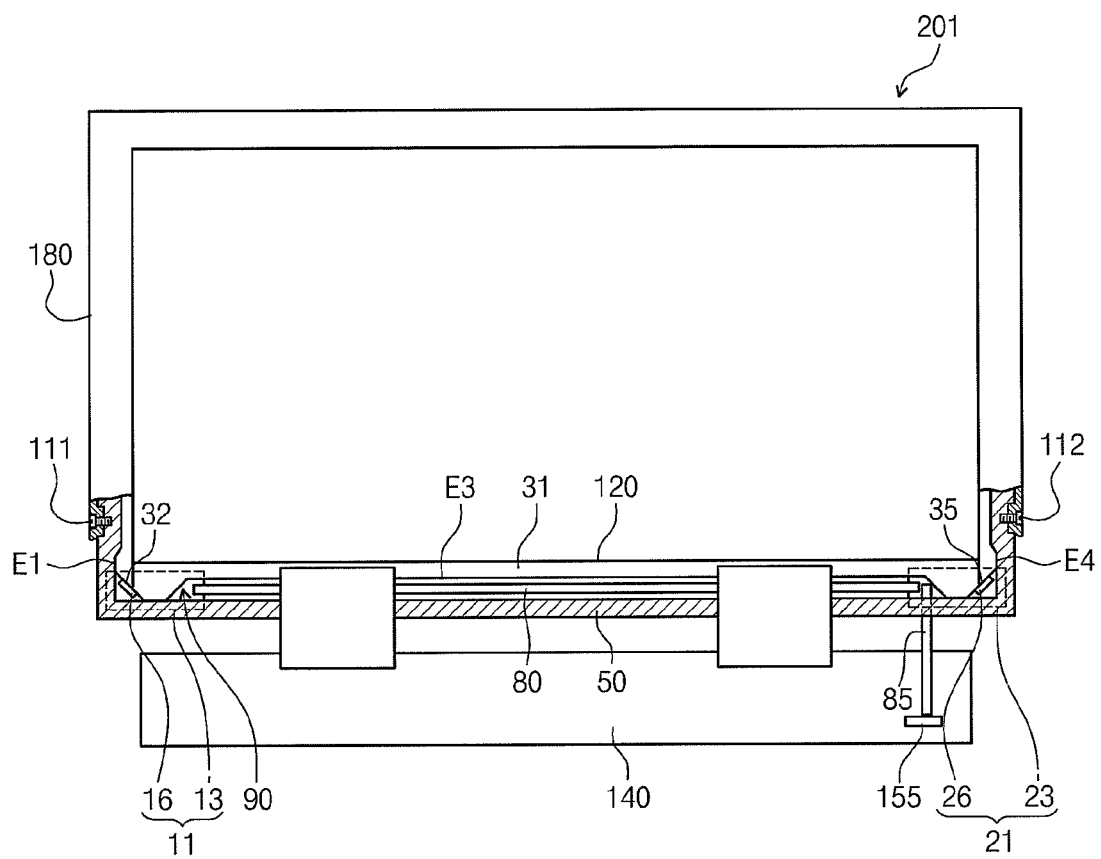
FIG. 13 is a plan view showing a display apparatus according to an exemplary embodiment of the present invention.

FIG. 13 is a plan view showing a display apparatus according to an exemplary embodiment. FIG. 13 shows a display apparatus 201 including the backlight assembly 101 described with reference to FIGS. 12A to 12D. In FIG. 13, the same reference numerals denote the same or similar elements in FIGS. 5A, 5B, and 12A to 12D.

Referring to FIG. 13, the display apparatus 201 includes the backlight assembly 101 shown in FIG. 12A, the display panel, the cover member 180, and the driving part 140.

The driving part 140 includes a power supply 155 to output a power source voltage, and the second wiring part 85 is electrically connected to the power supply 155. As described with reference to FIGS. 12A to 12D, the power source voltage may be provided to the first and second light source 16 and 26 through the first and second wiring parts 80 and 85 and the first and second light sources 16 and 26 may emit the light.

Figure 14A:
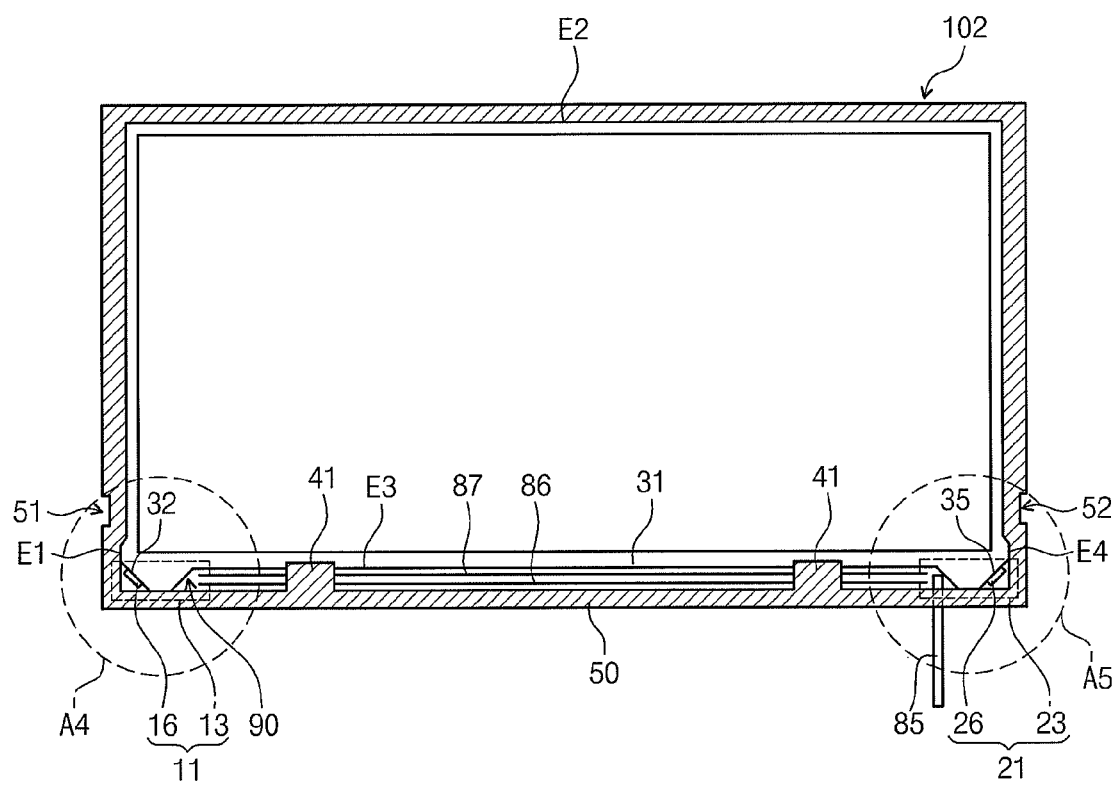
FIG. 14A is a plan view showing a backlight assembly according to an exemplary embodiment of the present invention.
Figure 14B:
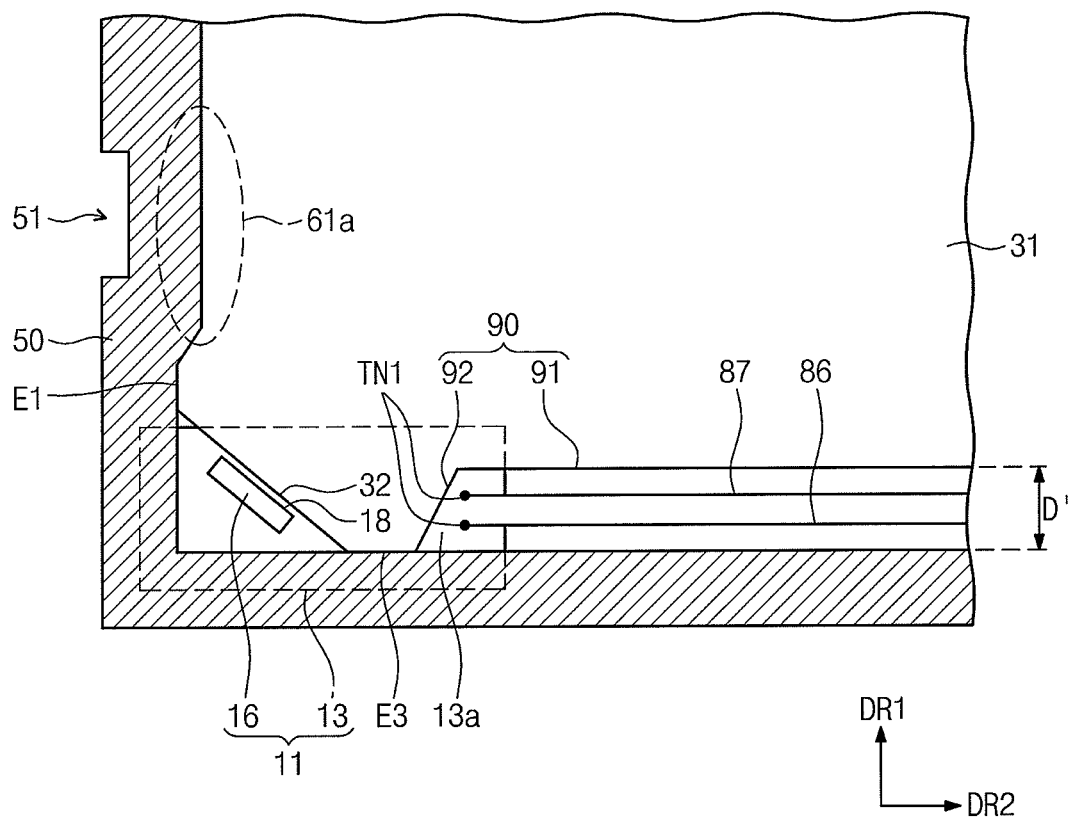
FIG. 14B is a partially enlarged view showing an area A4 of FIG. 14A.
Figure 14C:
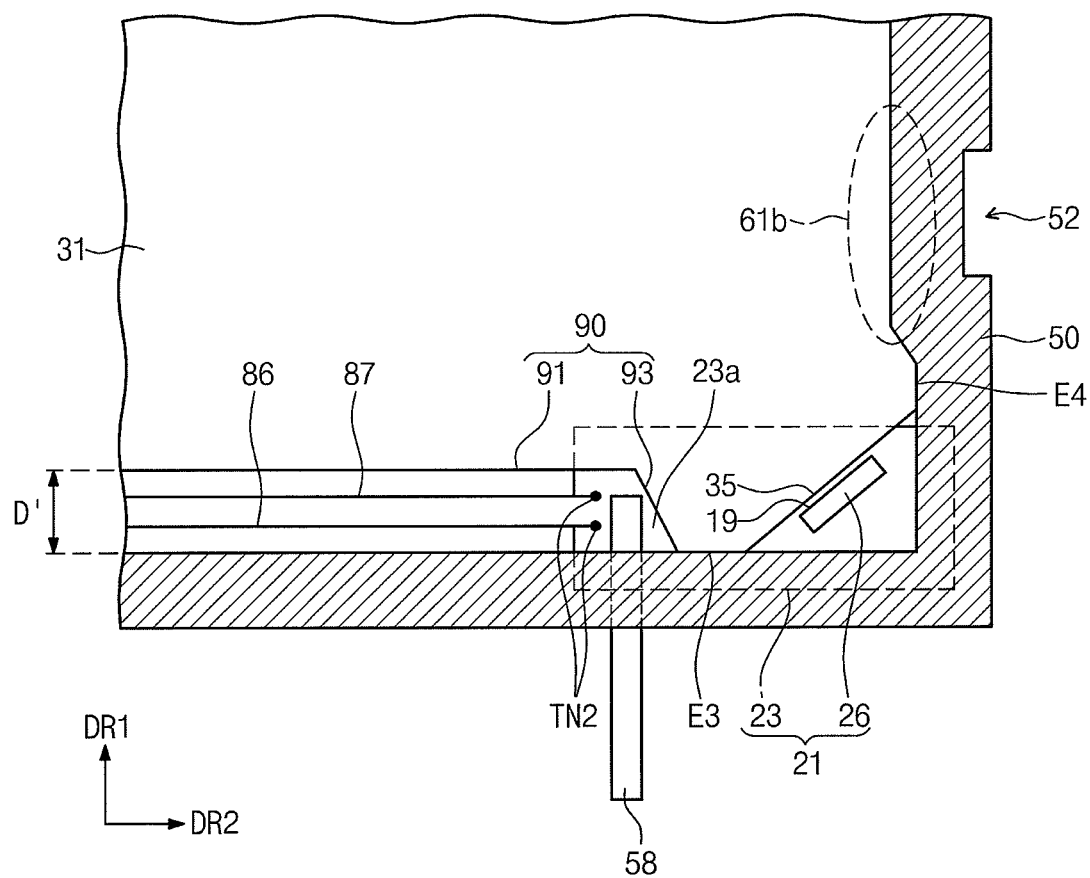
FIG. 14C is a partially enlarged view showing an area A5 of FIG. 14A.

FIG. 14A is a plan view showing a backlight assembly according to an exemplary embodiment of the present invention, FIG. 14B is a partially enlarged view showing a fourth area A4 of FIG. 14A, and FIG. 14C is a partially enlarged view showing a fifth area A5 of FIG. 14A. A backlight assembly 102 shown in FIGS. 14A to 14C includes a first lead wire 86 and a second lead wire 87 instead of the first wiring part 80 shown in FIG. 12A. Thus, the electrical connecting method between the first light source unit 11 and the second light source unit 21 is mainly described with reference to FIGS. 14A to 14C.

Referring to FIGS. 14A, 14B, and 14C, the first circuit substrate 13 includes the first portion 13a that is not covered by the light guide plate 31 and two first terminals TN1 disposed on the first portion 13a. The second circuit substrate 23 includes the second portion 23a that is not covered by the light guide plate 31 and two second terminals TN2 disposed on the second portion 23a.

The first lead wire 86 and the second lead wire 87 are electrically connected to the two first terminals TN1, respectively, and electrically connected to the two second terminals TN2, respectively. According to an exemplary embodiment, the first lead wire 86 may be soldered to one of the two first terminals TN1 and one of the two second terminals TN2, and the second lead wire 87 may be soldered to a remaining one of the two first terminals TN1 and a remaining one of the two second terminals TN2. The two first terminals TN1 and the two second terminals TN2 are not covered by the wiring recess 90 of the light guide plate 31. Accordingly, soldering of the first and second lead wires 86 and 87 to the two first terminals TN1 and the two second terminals TN2 can be facilitated.

Figure 15:
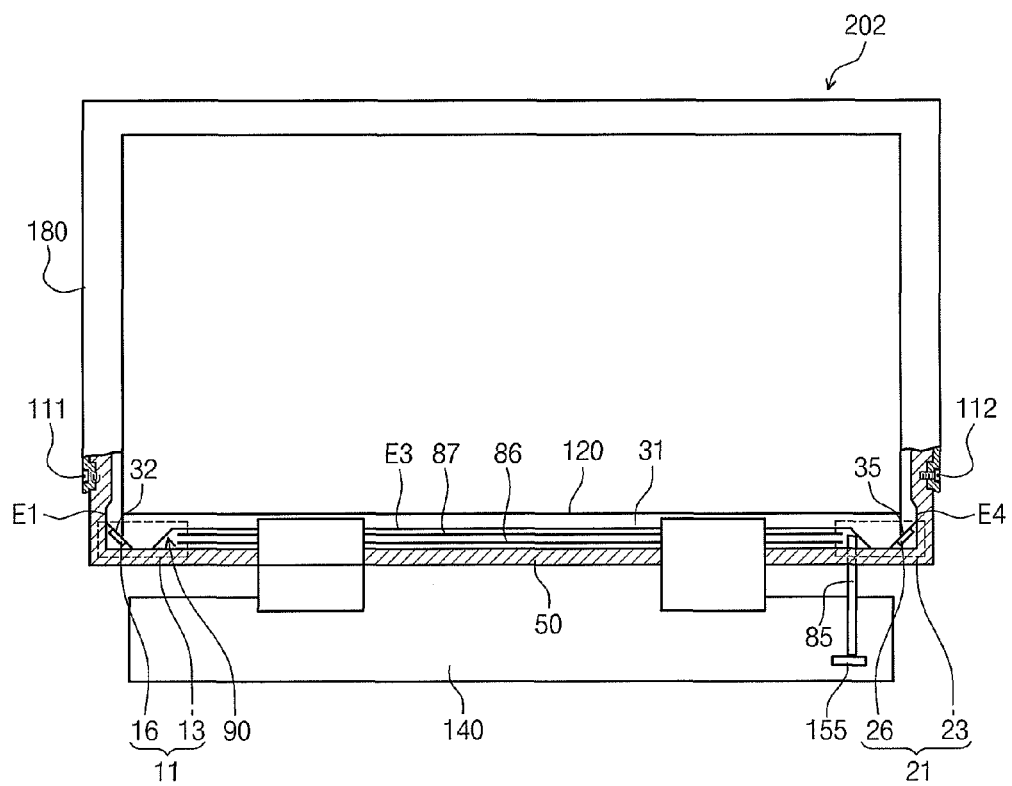
FIG. 15 is a plan view showing a display apparatus according to an exemplary embodiment of the present invention.

FIG. 15 is a plan view showing a display apparatus according to an exemplary embodiment of the present invention. FIG. 15 shows a display apparatus 202 including the backlight assembly 102 described with reference to FIGS. 14A to 14C. Accordingly, in FIG. 15, the same reference numerals denote the same or similar elements in FIGS. 5A, 5B, and 14A to 14C.

Referring to FIG. 15, the display apparatus 202 includes the backlight assembly 102, the display panel 120, the cover member 180, and the driving part 140.

The driving part 140 includes a power supply 155 to output a power source voltage and the wiring part 85 is electrically connected to the power supply 155. As a result, the power source voltage is provided to the first light source 16 and the second light source 26 through the wiring part 85, the first lead wire 86, and the second lead wire 87, so that the first and second light sources 16 and 26 may emit the light.

Figure 16A:
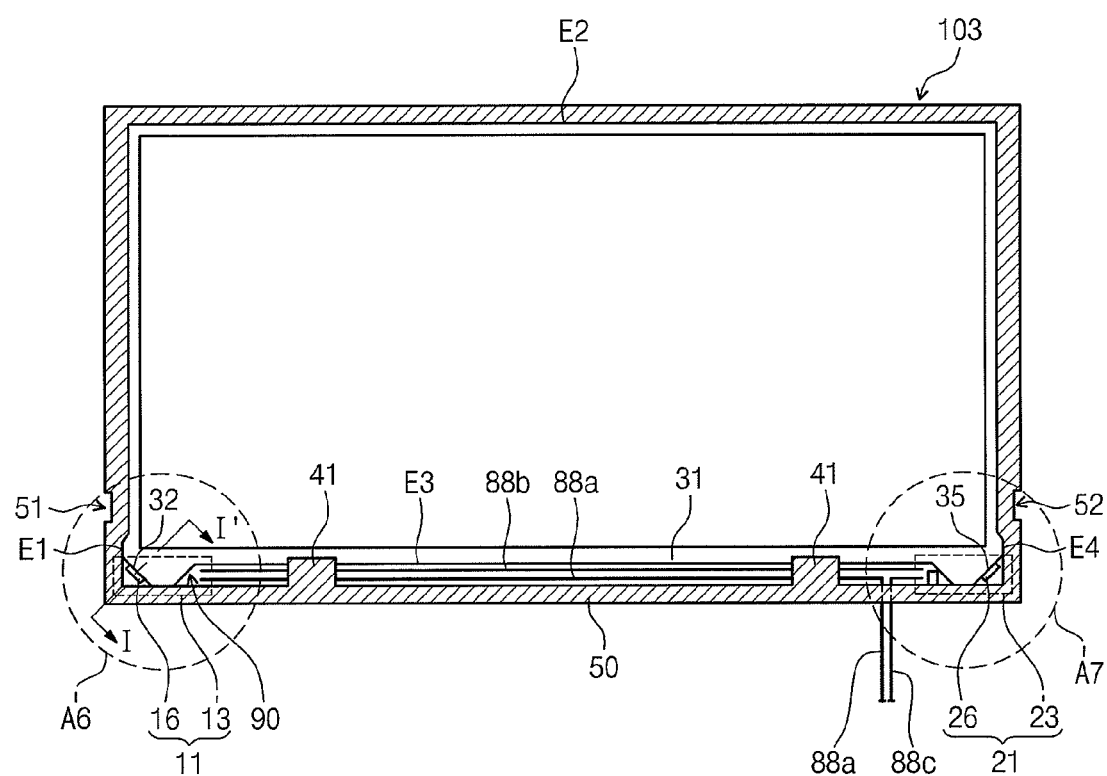
FIG. 16A is a plan view showing a display apparatus according to an exemplary embodiment of the present invention.
Figure 16B:
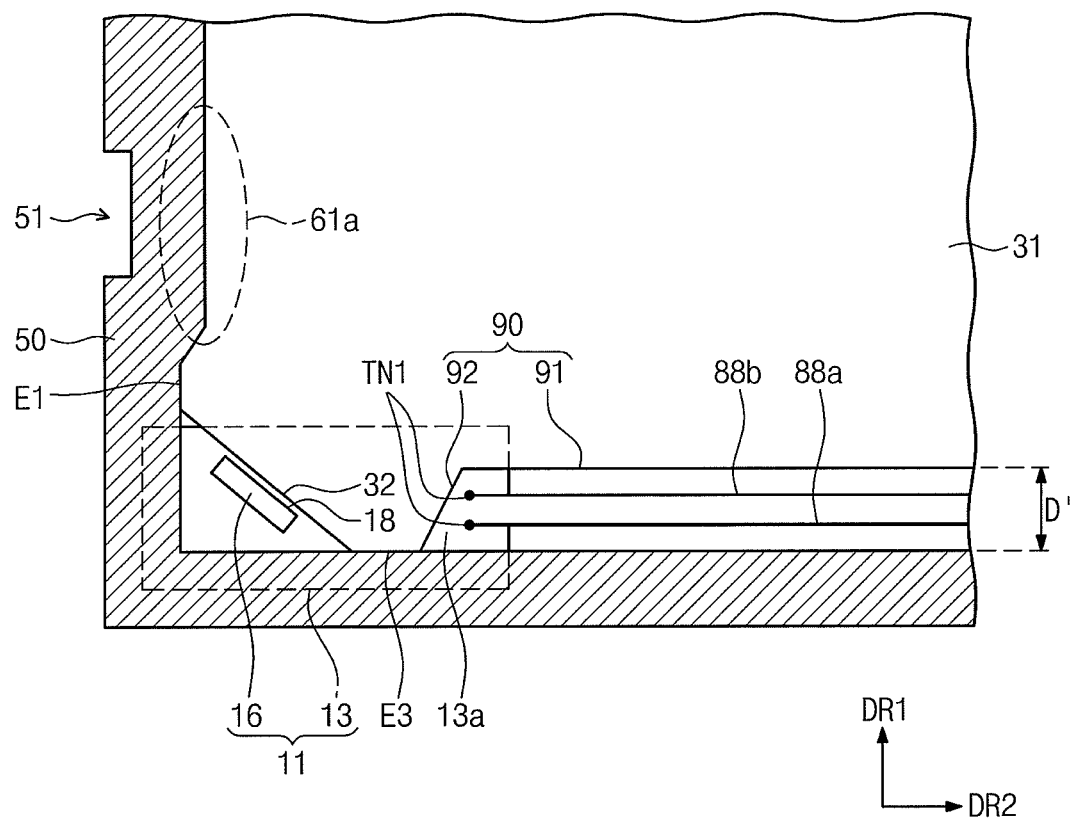
FIG. 16B is a partially enlarged view showing an area A6 of FIG. 16A.
Figure 16C:
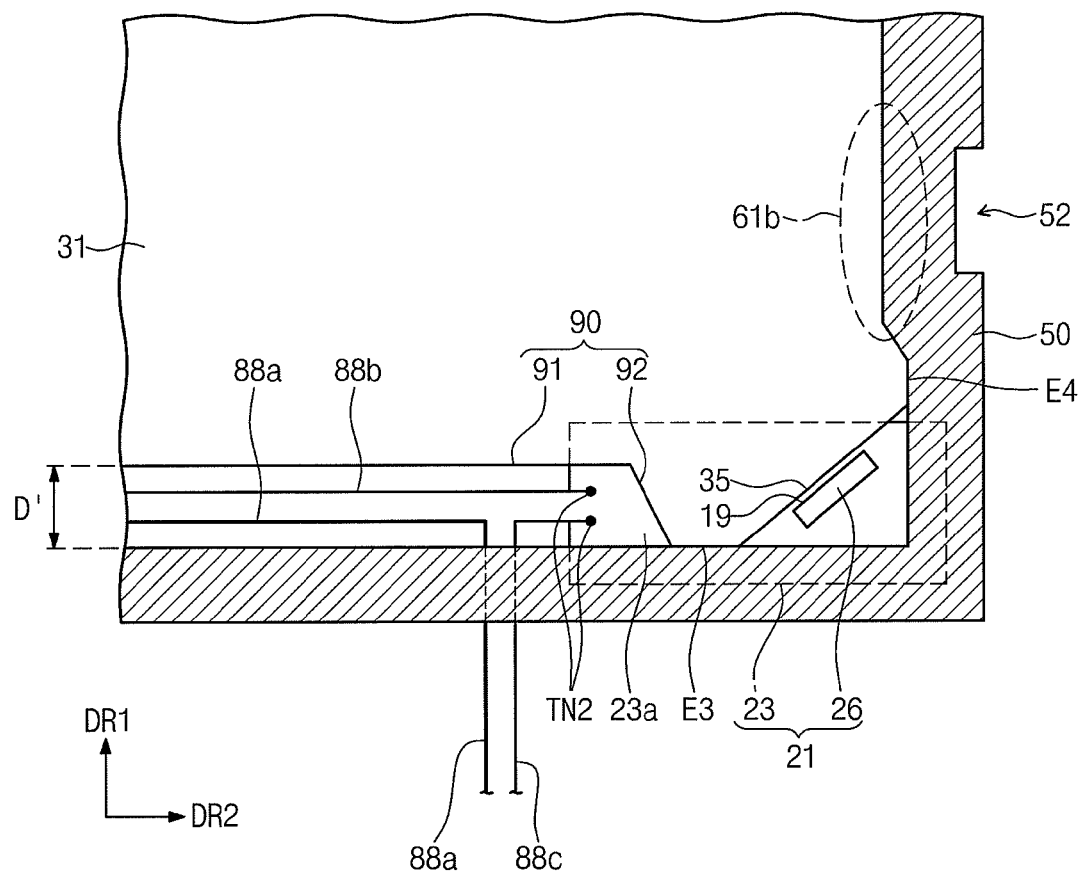
FIG. 16C is a partially enlarged view showing an area A7 of FIG. 16A.

FIG. 16A is a plan view showing a display apparatus according to an exemplary embodiment of the present invention, FIG. 16B is a partially enlarged view showing a sixth area A6 of FIG. 16A, and FIG. 16C is a partially enlarged view showing a seventh area A7 of FIG. 16A. A backlight assembly 103 shown in FIGS. 16A to 16C includes a first lead wire 88a, a second lead wire 88b, and a third lead wire 88c instead of the first and second wiring parts 80 and 85 shown in FIG. 12A. Thus, the electrical connecting method between the first light source unit 11 and the second light source unit 21 is mainly described with reference to FIGS. 16A to 16C.

Referring to FIGS. 16A, 16B, and 16C, the first circuit substrate 13 includes two first terminals TN1 and the second circuit substrate 23 includes two second terminals TN2. The first and second lead wires 88a and 88b are electrically connected to the two first terminals TN1, respectively, and the first and third lead wires 88a and 88c are electrically connected to the two second terminals TN2, respectively.

In addition, the first lead wire 88a and the third lead wire 88c are extended outside the receiving container 50 and electrically connected to a power supply (not shown). Thus, the power source voltage generated from the power supply may be provided to the first and second light sources 16 and 26 through the first, second, and third lead wires 88a, 88b, and 88c.

According to an exemplary embodiment, the first, second, and third lead wires 88a, 88b, and 88c may be soldered to the two first terminals TN1 and the two second terminals TN2. In this case, the two first terminals TN1 and the two second terminals TN2 are not covered by the wiring recess 90 of the light guide plate 31, to thereby facilitate the soldering process.

Figure 17:
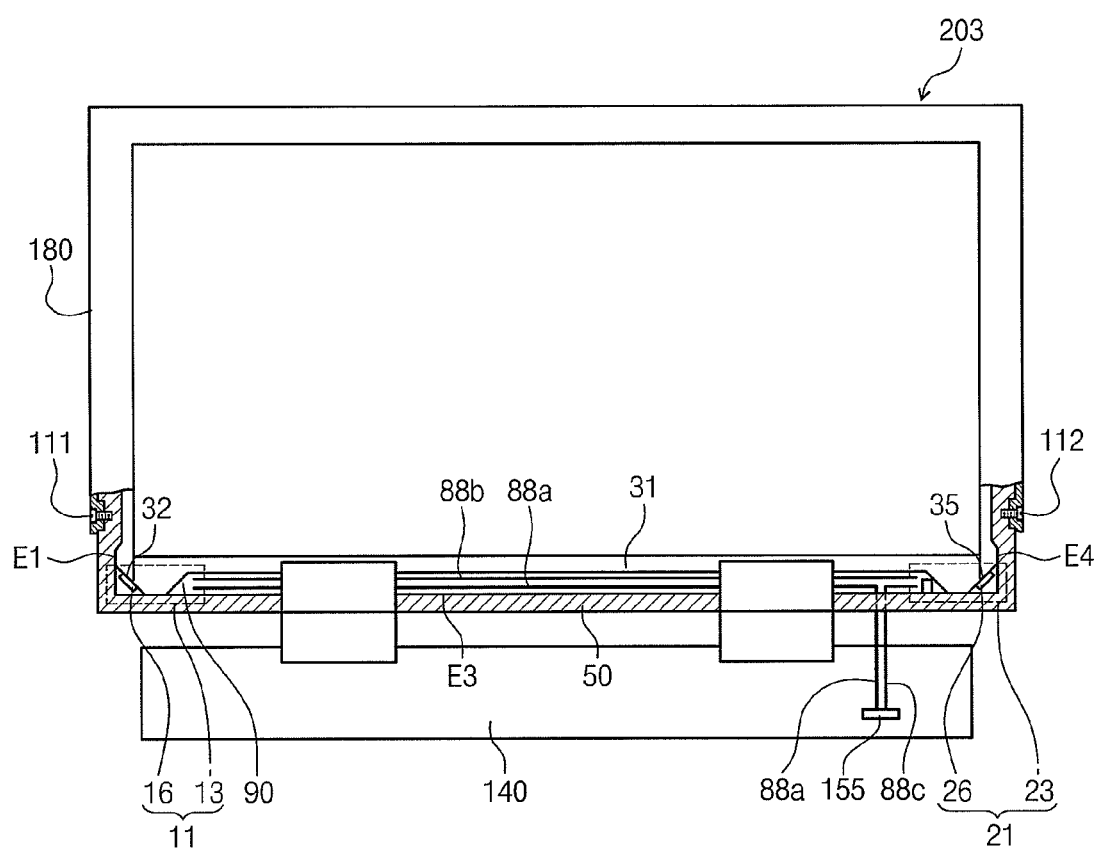
FIG. 17 is a plan view showing a display apparatus according to an exemplary embodiment of the present invention.

FIG. 17 is a plan view showing a display apparatus according to an exemplary embodiment of the present invention. FIG. 17 shows a display apparatus 203 including the backlight assembly 103 described with reference to FIGS. 16A to 16C. In FIG. 17, the same reference numerals denote the same or similar elements in FIGS. 5A, 5B, and 16A to 16C.

Referring to FIG. 17, the display apparatus 203 includes the backlight assembly 103 shown in FIG. 16A, the display panel 120, the cover member 180, and the driving part 140.

The driving part 140 includes a power supply 155 to output a power source voltage, and the first and third lead wires 88a and 88c extended outside the receiving container 50 are electrically connected to the power supply 155. Consequently, the power source voltage may be provided to the first light source 16 and the second light source 26 through the first, second, and third lead wires 88a, 88b, and 88c, and thus the first and second light sources 16 and 26 may emit the light.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
a light guide plate comprising at least one chamfered corner and at least one light incident surface defined by the chamfered corner;
at least one light source unit that generates light and is positioned adjacent to the light incident surface;
a display panel that receives the light to display an image;
a receiving container comprising a bottom and sidewalls extended from the bottom, wherein the receiving container receives the light guide plate and the light source unit;
a driving part electrically connected to the display panel to apply a driving signal to the display panel and electrically connected to the light source unit to apply a power source voltage to the light source unit, wherein the light guide plate comprises a first side surface connected to the light incident surface, wherein the first side surface has a coupling recess that is depressed from the first side surface, a cover member covering the display panel to expose an area where the image is displayed, the cover member being coupled to the sidewalls;

a user hole corresponding to the coupling recess formed in at least one of the sidewalls; and a coupling member coupled to the user hole to couple the receiving container to the cover member, wherein the coupling member is accommodated in the user hole and spaced apart from the light guide plate.

2. The display apparatus of claim 1, wherein the coupling recess includes at least one inner side surface and a bottom surface connected to the inner side surface, the inner side surface is spaced apart from the light incident surface, and the bottom surface is substantially parallel to the first side surface.

3. The display apparatus of claim 2, wherein the light guide plate comprises a second side surface contacting the first side surface, and the bottom surface contacts the inner side surface and the second side surface to connect the inner side surface and the second side surface.

4. The display apparatus of claim 2, wherein the coupling recess includes another inner side surface in addition to the at least one inner side surface, the bottom surface being disposed between the at least one inner side surface and the other inner side surface, and the at least one inner side surface and the other inner side surface are inclined at an oblique angle with respect to the bottom surface.

5. The display apparatus of claim 2, wherein the coupling recess includes another inner side surface in addition to the at least one inner side surface, the bottom surface being disposed between the at least one inner side surface and the other inner side surface, and the at least one inner side surface and the other inner side surface are perpendicular with respect to the bottom surface.

6. The display apparatus of claim 5, wherein the light guide plate comprises:

another chamfered corner and another light incident surface defined by the other chamfered corner;

a second side surface adjacent to a first side of the first side surface;

a third side surface adjacent to a second side of the first side surface and facing the second side surface; and a fourth side surface facing the first side surface, wherein the chamfered corner defining the at least one light incident surface is formed where the first side surface meets the third side surface, and the chamfered corner defining the other light incident surface is formed where the third side surface meets the fourth side surface.

7. The display apparatus of claim 6, further comprising another light source unit positioned adjacent to the other light incident surface, wherein:

the at least one light source unit comprises a first circuit substrate accommodated in the receiving container and a first light source mounted on the first circuit substrate to face the at least one light incident surface;

the other light source unit comprises a second circuit substrate accommodated in the receiving container and a second light source mounted on the second circuit substrate to face the other light incident surface;

a first wiring part electrically connecting the first circuit substrate to the second circuit substrate; and a second wiring part electrically connected to the second circuit substrate to apply the power source voltage to the first and second light sources.

8. The display apparatus of claim 7, wherein a portion of the third side surface is removed to form a wiring recess, the wiring recess is spaced apart from the at least one light incident surface and the other light incident surface, and the first wiring part is accommodated in the wiring recess.

9. The display apparatus of claim 8, wherein an end of the second wiring part extends outside the receiving container and is electrically connected to a power supply of the driving part.

10. The display apparatus of claim 8, wherein the removed portion of the third side surface has a width equal to a thickness of the light guide plate.

11. The display apparatus of claim 6, further comprising another light source unit positioned adjacent to the other light incident surface, wherein:

the at least one light source unit comprises a first circuit substrate accommodated in the receiving container and a first light source mounted on the first circuit substrate to face the at least one light incident surface;

the other light source unit comprises a second circuit substrate accommodated in the receiving container and a second light source mounted on the second circuit substrate to face the other light incident surface;

a first lead wire electrically connected to the first circuit substrate;

a second lead wire electrically connecting the first circuit substrate to the second circuit substrate; and a third lead wire electrically connected to the second circuit substrate, wherein each of the first lead wire and the third lead wire receives the power source voltage to drive the first and second light sources.

12. The display apparatus of claim 11, wherein the first circuit substrate comprises first terminals electrically connected to the first lead wire and the second lead wire, respectively, and the second circuit substrate comprises second terminals electrically connected to the second lead wire and the third lead wire, respectively.

13. The display apparatus of claim 12, wherein an end of the first lead wire and an end of the third lead wire are electrically connected to a power supply of the driving part.

14. The display apparatus of claim 11, wherein a portion of the third side surface is removed to form a wiring recess, the wiring recess is spaced apart from the at least one light incident surface and the other light incident surface, and the first, second and third lead wires are accommodated in the wiring recess.

15. The display apparatus of claim 14, wherein the removed portion of the third side surface has a width equal to a thickness of the light guide plate.

16. The display apparatus of claim 6, wherein an acute angle formed by the third side surface and the at least one light incident surface is in a range of about 30 degrees to about 60 degrees and an acute angle formed by the third side surface and the other light incident surface is in a range of about 30 degrees to about 60 degrees when viewed in a plan view.

17. The display apparatus of claim 6, wherein the at least one light source unit comprises:

at least one light source comprising a light emitting surface from which the light exits; and a circuit wiring part electrically connected to the light source and the driving part, and wherein another light source unit is positioned adjacent to the other light incident surface.

18. The display apparatus of claim 17, wherein the circuit wiring part comprises a circuit substrate accommodated in the receiving container and a connector disposed on an end of the circuit substrate and extending outside the receiving container, and the connector is connected to a power supply of the driving part.

19. The display apparatus of claim 17, wherein the circuit wiring part comprises a circuit substrate accommodated in the receiving container and a terminal disposed on an end of the circuit substrate and extending outside the receiving container, and the terminal is soldered to a power supply of the driving part.

20. The display apparatus of claim 17, wherein the circuit wiring part comprises a lead wire accommodated in the receiving container, and an end of the lead wire extends outside the receiving container and is electrically connected to the driving part.

21. The display apparatus of claim 20, wherein at least one of the sidewalls is provided with a recess to accommodate the lead wire.

22. The display apparatus of claim 1, wherein the removed portion of the first side surface has a width equal to a thickness of the light guide plate.

23. The backlight assembly of claim 1, wherein the light guide plate comprises:
  another chamfered corner and another light incident surface defined by the other chamfered corner;
  a second side surface adjacent to a first side of the first side surface;
  a third side surface adjacent to a second side of the first side surface and facing the second side surface; and
  a fourth side surface facing the first side surface, wherein the chamfered corner defining the at least one light incident surface is formed where the first side surface meets the third side surface, and the chamfered corner defining the other light incident surface is formed where the third side surface meets the fourth side surface.

24. The backlight assembly of claim 23, wherein an acute angle formed by the third side surface and the at least one light incident surface is in a range of about 30 degrees to about 60 degrees and an acute angle formed by the third side surface and the other light incident surface is in a range of about 30 degrees to about 60 degrees when viewed in a plan view.

* * * * *